United States Patent
Raymond et al.

(10) Patent No.: US 7,480,100 B1
(45) Date of Patent: *Jan. 20, 2009

(54) LENTICULAR DEVICES USING SETS OF LENSES TO DISPLAY PAIRED SETS OF INTERLACES OF IMAGES

(75) Inventors: Mark A. Raymond, Littleton, CO (US); Howard G. Lange, Mount Prospect, IL (US)

(73) Assignee: Genie Lens Technologies, LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/872,338

(22) Filed: Oct. 15, 2007

(51) Int. Cl.
    *G02B 27/10* (2006.01)
(52) U.S. Cl. .......................... 359/626; 359/619; 40/454
(58) Field of Classification Search ................ 359/454, 359/455, 469, 619, 626, 628; 40/454
See application file for complete search history.

(56) References Cited

U.S. PATENT DOCUMENTS

| | | | |
|---|---|---|---|
| 4,164,748 A | 8/1979 | Nagata | |
| 4,387,959 A | 6/1983 | Lange et al. | |
| 4,480,893 A | 11/1984 | Fantone | |
| 5,012,274 A | 4/1991 | Dolgoff | |
| 5,616,912 A | 4/1997 | Robinson et al. | |
| 5,695,346 A | 12/1997 | Sekiguchi et al. | |
| 5,731,883 A | 3/1998 | Morton et al. | |
| 5,731,899 A | 3/1998 | Meyers | |
| 5,835,194 A | 11/1998 | Morton | |
| 5,842,762 A | 12/1998 | Clarke | |
| 5,924,870 A | 7/1999 | Brosh et al. | |
| 5,933,228 A | 8/1999 | Taylor et al. | |
| 5,959,718 A | 9/1999 | Morton | |
| 5,967,032 A | 10/1999 | Bravenec et al. | |
| 6,091,479 A | 7/2000 | Frosig et al. | |
| 6,177,953 B1 | 1/2001 | Vachette et al. | |
| 6,224,214 B1 | 5/2001 | Martin et al. | |
| 6,256,149 B1 | 7/2001 | Rolfe | |
| 6,424,467 B1 | 7/2002 | Goggins | |
| 6,481,849 B2 | 11/2002 | Martin et al. | |
| 6,490,093 B2 | 12/2002 | Guest | |
| 6,624,946 B2 | 9/2003 | Franko, Sr. | |
| 6,781,761 B2 * | 8/2004 | Raymond | 359/619 |
| 6,795,250 B2 | 9/2004 | Johnson et al. | |
| 6,831,787 B1 | 12/2004 | Scarbrough et al. | |
| 6,859,240 B1 | 2/2005 | Brown et al. | |
| 6,943,953 B2 | 9/2005 | Raymond | |
| 6,984,425 B2 | 1/2006 | Raymond | |

(Continued)

*Primary Examiner*—Joseph Martinez
(74) *Attorney, Agent, or Firm*—Kent A. Lembke; Marsh Fischmann & Breyfogle LLP

(57) ABSTRACT

A lenticular device for displaying interlaced images. The device includes an interlaced image and a lens array. The lens sets each have two or more adjacent lenticules and are paired mapped to sets of the image elements such that two or more lenses are used to visually display a set of image elements rather than a single lenticule. The number of lenses is a non-integral multiple of the number of image elements in the image set such that the rays exiting from the lens sets are at unique viewing angles associated with each of the image elements. The image sets include interlaces from sequential images, and the interlaces are provided in the interlaced image so as to have an order that differs from the sequential ordering of the images to provide a sequential output of the images.

20 Claims, 15 Drawing Sheets

U.S. PATENT DOCUMENTS

| | | | |
|---|---|---|---|
| 6,995,913 | B2 | 2/2006 | Goggins |
| 7,002,748 | B1 | 2/2006 | Conley et al. |
| 7,016,116 | B2 | 3/2006 | Dolgoff |
| 7,019,865 | B2 | 3/2006 | Nims et al. |
| 7,038,854 | B2 | 5/2006 | Raymond |
| 7,046,271 | B2 | 5/2006 | Doerfel et al. |
| 7,057,823 | B1 | 6/2006 | Raymond |
| 7,075,725 | B2 | 7/2006 | Tomczyk |
| 7,083,340 | B2 | 8/2006 | Goggins |
| 7,149,035 | B2 | 12/2006 | Goggins |
| 7,151,541 | B2 | 12/2006 | Seder |
| 7,153,047 | B2 | 12/2006 | Goggins |
| 7,164,537 | B2 | 1/2007 | Raymond |
| 7,307,790 | B1 | 12/2007 | Raymond et al. |
| 7,414,790 | B2 * | 8/2008 | Raymond et al. .......... 359/626 |
| 2002/0021832 | A1 | 2/2002 | Dawson |
| 2002/0135177 | A1 | 9/2002 | Welch |
| 2003/0103351 | A1 | 6/2003 | Privas et al. |
| 2004/0043203 | A1 | 3/2004 | Bogdanovic |
| 2004/0263885 | A1 | 12/2004 | Tomczyk |
| 2005/0135798 | A1 | 6/2005 | Szajewski et al. |
| 2005/0180006 | A1 | 8/2005 | Mendoza |
| 2005/0286134 | A1 | 12/2005 | Goggins |
| 2006/0052152 | A1 | 3/2006 | Tedsen et al. |
| 2006/0082877 | A1 | 4/2006 | Wang |
| 2006/0146410 | A1 | 7/2006 | Krause |

* cited by examiner

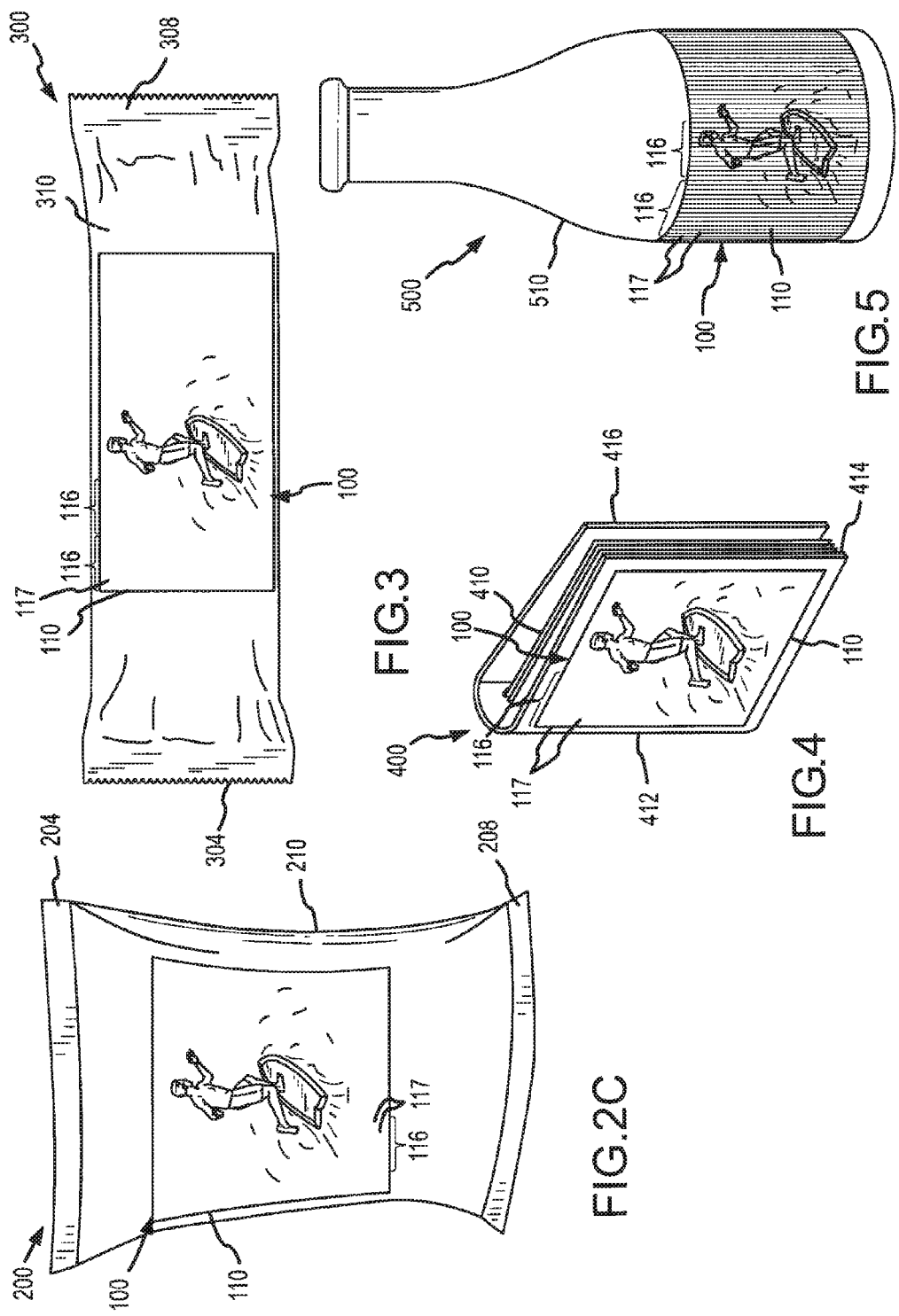

FIG.11B

FIG.12B

LENTICULAR DEVICES USING SETS OF LENSES TO DISPLAY PAIRED SETS OF INTERLACES OF IMAGES

BACKGROUND OF THE INVENTION

1. Field of the Invention

The present invention relates, in general, to lens arrays and devices for use in viewing or displaying images that are interlaced to display animated, three-dimensional (3D), and other images, and, more particularly, to lenticular devices, as well as products incorporating such lenticular devices and methods of fabricating such lenticular devices, that include a lens array or sheet of lenticular material combined with an interlaced image such that more than one lens or lenticule (or a lens set) is used to view or display each set of interlaced images that is repeated across the interlaced image.

2. Relevant Background

There is a continuing and growing demand for lenticular devices that can effectively provide elaborate graphics. This demand is due in part to the need for the retailers to separate their products from other products, and one effective technique is to enhance shelf appeal by including eye-catching imagery such as animation or a three-dimensional (3D) effect. For example, water bottles are presently sold with wrap-around labels that display images, and gift cards are sold at a large majority of retail stores that include animation or 3D images. Such imagery can be provided by using lenticular graphic labels to provide three-dimensional (3D) and animated imagery such as a short clip of a movie. Lenticular lens material is used in the packaging industry for creating promotional material with appealing graphics and typically involves producing a sheet of lenticular lens material, applying an image to the lens material, and adhesively attaching the lenticular lens material to a separately produced object for display.

In general, the production of lenticular devices such as gift cards and labels includes selecting a number of images such as sequential portions of a movie or animated clip to use to create a desired visual effect. Each of these images are sliced into a predefined number of slices or interlaces (such as 10 to 30 or more slices per image), and the slices of each image are interlaced to form an interlaced image made up of a large number of image sets or sets of interlaces. Lenticular lenses or lens sheets are then mapped to the interlaced image, and the lenticular lenses are fabricated according to this mapping such that each lenticular lens is paired with (or covers) one of the sets of interlaces. The lenticular material or lens sheet generally includes a transparent web that has a flat side or layer and a side with optical ridges and grooves formed by linear or elongated lenticules (i.e., lenses) arranged side-by-side with the lenticules or optical ridges extending parallel to each other over the length of the transparent web. To provide the unique visual effects, ink (e.g., four color ink) is applied to or printed directly on the flat side of the transparent web to form a thin ink layer or the image layer containing the sets of interlaces or image slices, which is then viewable through the transparent web of optical ridges.

Each lenticule or lens of the lenticule layer is paired or mapped to a fairly large set or number of the interlaced image slices or elements. For example, one lenticule may be paired with up to 10 to 30 or more interlaced image slices or interlaces depending on images (or frames of a movie clip or the like is used), and generally only one of the slices or interlaces is visible through the lenticule at a time based on the position of the lenticule relative to a viewer's eye. In other words, the animation, 3D, or other graphic effect is achieved by moving the lenticule or the viewer's position to sequentially view each of the interlaced image slices under the lenticule and allow a viewer to see each of the images or frames in the interlaced image or ink layer by combining the slices or interlaces viewed from all the lenticules.

In producing conventional lenticular lens material and lenticular devices, it is desirable to use as little material as possible, i.e., to produce effective lenticules or lenticular lens arrays or sheets with as thin as web material as possible. Decreasing lens thickness is also desirable to facilitate fabrication using techniques, such as web printing, that are very difficult or impractical with thicker lens materials. Thin lenticular lens material is desired to save on material costs and to provide a relatively flexible lens material or substrate that can be easily applied to products such as gift, smart, and credit cards, and product containers, such as in a label that can be attached to a box or to a bottle as part of a wraparound label or on a cup to provide desirable visual effects.

However, such shrinking of the lenticles has proven very difficult with limitations associated with printing the interlaced images often preventing the lens layer or web from being made very thin. As noted above, all the interlaced slices for each image set or set of interlaces are placed underneath a single lenticule such that numerous slices have to be printed with very little width to be mapped to the lenticles width or pitch. However, the printing can presently only be done with a limited degree of resolution. With coarser lens arrays (i.e., with lower frequency or lenses per inch (LPI)), the printing can be accomplished more easily and mapping to lenticules of the image slices achieved more accurately. However, coarser lens arrays with frequencies of 10 to 30 LPI tend to be very thick because general physics or optical rules for focusing with conventional lenticular material require that more lens thickness or more lens material be provided to achieve effective focusing. For example, a 15 LPI lenticular lens array with a fairly common viewing angle (such as a 22-degree viewing angle) may be mapped to an interlaced image that is printed or provided directly behind the lenticular lens array, with each of the lenticules in the lens array being mapped to or paired with all image slices of a paired segment of the interlaced image. If the lens array is formed from acrylic, the lens array would need to be about ⅜-inch thick to enable the lenticules to properly focus on the paired image slices. Conversely, the frequency of the lenticular lens array may be increased (i.e., a finer lens array may be used). However, existing limitations on printing have resulted in the thinnest lenticular lens arrays being at least about 8 to 120 mils thick, and the mapping accuracy required at these lower thicknesses and higher lenticule frequencies often results in lower quality imaging results and increased fabrication or printing costs.

FIG. 1 illustrates a conventional lenticular device 10 in common use for products such as gift cards and in labels. The lenticular device 10 includes a lens array or sheet 12 with lenticules or lenses 16 formed on one side. On an opposite planar side 14, an image layer or ink layer 20 is provided that includes a plurality of interlaces or image slices 22 that are provided with in image sets or sets of interlaces under each of the lenticules or lenses 16. The interlaces 22 correspond to an interlaced image that is made up of only three images or image frames in this simplified example, and using conventional mapping techniques, each image set or set of interlaces includes three interlaces (i.e., an interlace corresponding to each of the three images or image frames) provided under each lens 16.

The number of images or frames in the interlaced image is chosen such that the interlaced images are an integral multiple of the lenticular pitch and such that the entire image set or set of interlaces fits completely underneath a paired or mapped lenticule or lens. This insures that the same pattern of angular spread of images exists across the lenticular structure, which is shown in FIG. 1 where three interlaces corresponding to the first, second, and third image or image frame are placed under each lenticule 16 in a similar position such that the rays that exit the lens sheet or array are at the same angle (as shown by rays 30, 34, and 38 associated with these three images). In practice, there may be a small change in angular distribution of the rays 30, 34, 38 across the structure 10, but the rays essentially drift together in the usable zone presented to a viewer so that the structure 10 may have to be titled to see a desired effect such as motion, flash, or 3D.

While such conventional lenticular devices are useful, printing limitations associated with providing interlaces at small widths has proven difficult and limiting of the thickness of the lenticular sheet or lens array. For example, a traditional lenticular sheet may be provided with a lens frequency 62 LPI, and using standard printing methods, this provides a maximum printability of about 20 images per lens. In other words, the interlaced image could potentially include 20 images or frames of a movie such that 20 interlaces would be provided in each image or interlace set mapped to each lenticule or lens. A 62 LPI lens array results in each lens or lenticule having a width of about 16.7 mils such that the each of the 20 interlaces or image slices has a width of about 0.833 mils. Using standard printing methods, an interlace width of 0.833 mils is acceptable with printing thinner interlaces (such as down to around 0.5 mils) being much more difficult if not impractical.

There is, however, a growing demand for lenticular devices that can display interlaced images with a much greater number of images or information than standard printing methods can readily support. For example, there is significant demand for lenticular devices that can produce video or animation clips or imagery that is several seconds in length. Instead of 20 images or frames being provided in an interlaced image, these effects may require 30 to 50 or more images or frames. Building on the example of a 62 LPI lens array or lenticular sheet, it may be desirable to provide 58 images in an interlaced image, and using conventional interlacing or printing techniques, this would result in 58 interlaces in each image set being positioned under each lens. The lens is 16.7 mils wide so this results in an interlace width of about 0.28 mils for each interlace which is considered by many to be impossible or nearly impossible to image on plates or film (e.g., is much less than the 0.5 to 0.7 mils printing width believed by many in the industry to be a practical limit for printing interlaces) or at least impractical for most printing applications particularly a CMYK format in which all colors must register accurately in this small space or slice width. Additionally, the lens or lenticule likely will not focus this finely. Further, the data file required for the interlaced image would be very large (e.g., a size of 3,596 dots per inch (DPI)), which may create processing problems during creation of the image file and achieving proper mapping to the lenticular lens array.

Hence, there remains a need for lenticular devices or structures that provide an alternative to conventional lenticular lens arrays so that lens arrays or structures can be provided to view conventional interlaced images (e.g., images interlaced as for use with conventional lenticular material to achieve 3D, animation, or other visual effects) and advanced interlaced images (e.g., interlaced images with significantly greater number of images, frames, or information to create longer animation clips or animation or improved effects). Preferably, such lenticular devices would allow the lenticular sheet or lens array to be manufactured using relatively conventional techniques and also allow the interlaced image or ink layer to combined with the lenticular sheet inexpensively to produce high quality but affordable products such as cards, labels, and packaging that incorporate the lenticular devices.

SUMMARY OF THE INVENTION

The present invention addresses the above problems by providing lenticular devices or display assemblies that combine lenticular material or lens arrays with interlaced images such that a set of lenticules or lenses (e.g., two or more lenses) are paired with an image set or set of interlaces. In conventional lenticular material, in contrast, each image set is mapped to a single lenticule such that image slices associated with a particular image are all distributed in a particular direction or at a particular distribution angle. For example, a lens set with 5 lenses may be used to display an image set having 32 interlaces (or image slices in interlaces) of an interlaced image.

In typical embodiments, the interlacing is "non-integral" in that the number of lenses is preferably not a multiple of the number of lenses in the lens sets such that the rays from each image are more likely to be separated or not blending, which may be the case when an integer or whole number of interlaces is placed under each lenticule (e.g., the interlacing pattern may be considered fractional as the number of interlaces is typically a decimal such as a decimal between 1 and 2 or between 2 and 3 and so on). Further, the interlacing pattern is not a conventional sequential ordering of the image slices in the interlaces in a majority of the embodiments.

A sorting algorithm is used to process parameters such as brightness values for the distributed rays, the number of interlaces, the number of lenticules in a lens set, the size of the lenticules, the thickness and material of the lens array, and the like. The sorting algorithm provides a non-standard interlacing pattern (e.g., non-sequential) that results in the images or distributed rays being distributed at unique viewing angles or at unique angular distributions that provide the interlaces in a sequential pattern (e.g., the image slices are visible in a stepwise manner in the produced output image over the viewing angle of the lens set such as image 1 being visible at a first angle, image 2 being visible at a second angle adjacent the first angle, and so on).

The use of a lens set combined with non-integral, non-sequential interlacing allows the interlaced image to include interlaces or image slices with significantly larger widths for a particular lenticular material, e.g., for a particular LPI, which facilitates printing and also facilitates providing greater numbers of images or frames in the interlaced image to produce an enhanced visual image or effect such as longer animation or video.

More particularly, a lenticular device is provided for displaying images such as those with animation, motion, and 3D and other effects. The device includes an interlaced image with sets of elongate image elements such as may be provided in an ink layer. The device further includes a lens array with a first side proximate to the interlaced image and a second side having elongate lenses or lenticules. The lens sets each have two or more adjacent lenticules and are paired with or mapped to one of the sets of the image elements such that two or more lenses are used to visually display the set of image elements rather than a single lenticule as in conventional lenticular assemblies.

The number of lenticules in each set is typically equal and the number of image elements is selected such that when it is divided by the number of lenticules the result or quotient is a non-integer (or, in other words, the number of lenses is a non-integral multiple of the number of image elements in the image set). The number of lenticules is often 3 or more and the number of image elements in each set is often greater than 10 (e.g., because data sets with greater numbers of images are more difficult to print but are well-suited for embodiments of the invention). The rays exiting from each of the lens sets preferably are dispersed or distributed at unique viewing angles associated with each of the image elements (e.g., provide small angular distribution for each of the image elements within a larger viewing angle associated with the lens set). Each of the sets of the image elements includes interlaces (or slices of images in interlaces) taken from images or frames that have a sequential ordering (e.g., the images provide a movie or effect if viewed in a particular sequential order), and the interlaces are provided in the interlaced image so as to have an order that differs from the sequential ordering. For example, the order of the interlaces may be chosen (such as with a sorting algorithm described in detail herein) such that rays exiting the lens sets correspond to the images in the sequential ordering.

The lens array may have a variety of thicknesses to practice the invention such as less than about 30 mils, and likewise, the lenticules may be provided at a wide range of frequencies such as at 30 LPI or greater. The lens set has a width equal to the combined width of the lenticules making up the set (such as 3 times the width of each lenticule when 3 lenticules are used in each lens set) and the image elements typically use up this width by having each element have a width equal to about the lens set width divided by the number of image elements in each image set.

BRIEF DESCRIPTION OF THE DRAWINGS

FIGS. 2C-5 illustrate representative products that are shown to include the lenticular device of FIG. 2A or FIG. 2B as a label/decal or more integral part of a product sidewall;

FIGS. 11A-11B illustrates a brightness plot for an embodiment of a lenticular device in which a lens set including 3 lenticules or lenses is used to display an image set or set of interlaces having 58 image slices or interlaces showing the undesired mixing resulting from use of a convention, sequential ordering of the interlaces as would be used if the image set were displayed by a single lenticule in a conventional lenticular device; and FIGS. 12A-12B illustrate a brightness plot of the lenticular device of FIGS. 11A-11B when the interlaced image is modified such that the interlaces in the image set are provided in a non-standard ordering or pattern that produces a desired relationship among the interlaces to achieve a desired image or effect (e.g., one in which the images are shown sequentially across a viewing angle (i.e., each at their own viewing or directional angle or angular range) even though they are provided in the image set in a different order).

DETAILED DESCRIPTION OF THE PREFERRED EMBODIMENTS

Figure 1:
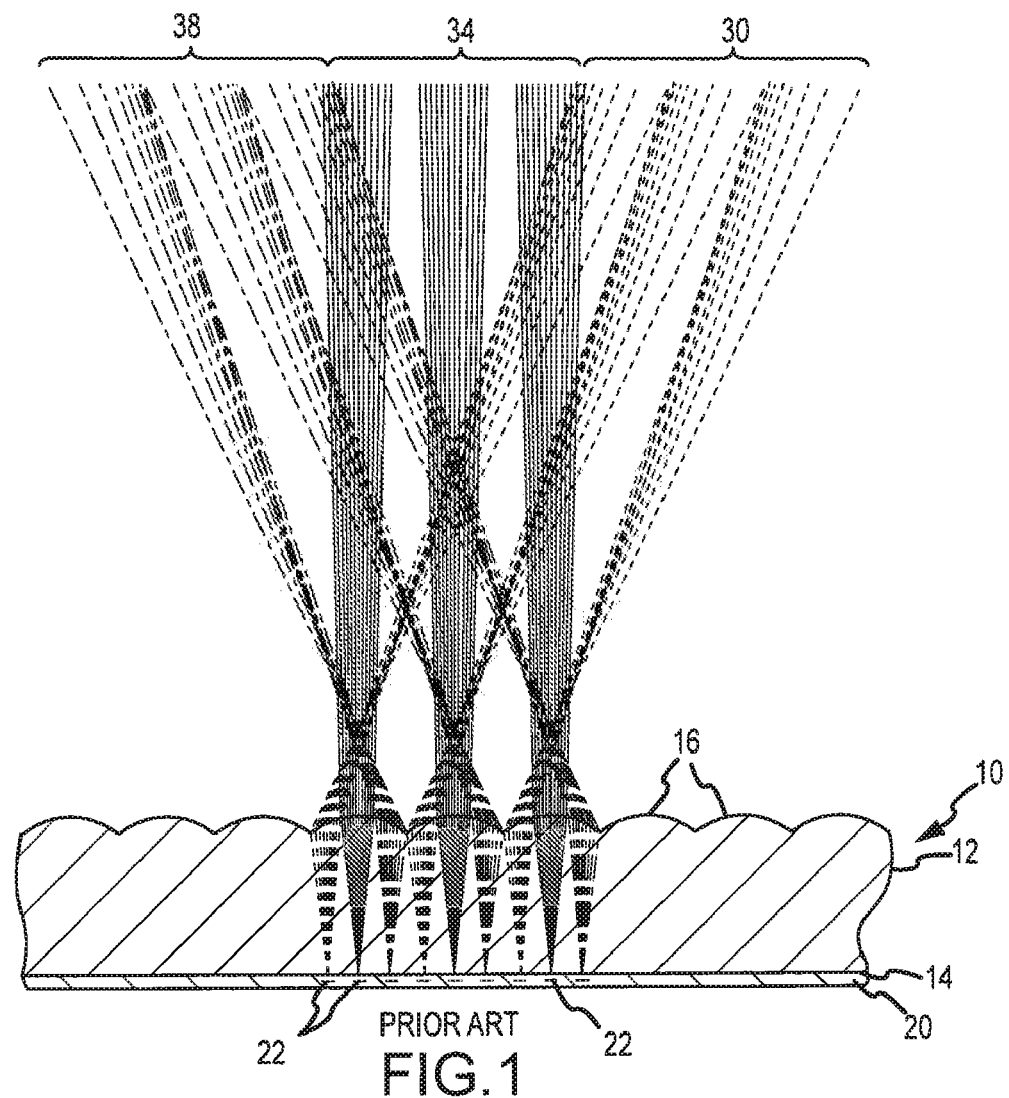
FIG. 1 is a sectional view of a prior art lenticular device with ray tracing showing the common angular distribution of interlaces associated with a particular image or image segment in an interlaced image.

Generally, the present invention is directed to lenticular devices or assemblies that combine the concepts of using sets of lenticules to view an image set or set of interlaces and designing or configuring the interlaced image in a non-standard manner to achieve a desired output image or effect. The non-standard method of interlacing may be considered or labeled non-integral interlacing in that the number of interlaces relative to the number of lenses in the lens set is typically selected such that the quotient of the number of images divided by the number of lenses in a lens set is not a whole number (i.e., the number of lenses is not an integral multiple of the number of interlaces or image slices in the image set). For example, a lens set may contain 4 lenticules and an image set may contain 9 image slices or a lens set may contain 5 lenticules and an image set may contain 38 image slices, with the number of combinations being nearly limitless. The non-standard method of interlacing may also be considered or labeled non-sequential interlacing (ascending or descending which is used in conventional interlacing) because embodiments of the invention sort the interlaces (or the image slices associated with such interlaces) such that the output image or rays from the interlaces are sequential even though two or more lenses of lens set are used to distribute the rays from the image set rather than a single lens. A sorting algorithm is typically utilized but such sorting can be performed manually to achieve a desired output result (such as sequential angular distributions of the rays from the images or frames of the interlaced image which will typically require that the image slices of each image set not be sequentially mapped to the lens set as explained in detail below).

The interlacing techniques of the invention, including non-integral interlacing, can be used to fabricate lenticular devices in which images in lenticular optics can be combined for both 3D images and motion imaging. This type of interlacing can be used to decrease file sizes, decrease the number of images under each lens, and decrease the printing difficulty exponentially. A premise behind this type of interlacing is to combine multiple lenses together to get them to work "in concert" together as one traditional lens thus providing greater data space under the lenses (when compared to conventional single lenticule techniques). To provide practical context, an example of a traditional lens frequency may be a lens with a frequency or LPI (lenses per inch) of 62, providing a maximum printability of about 20 images per lens using well-known and accepted printing practices. A 62-LPI lens array provides approximately 16.66 mils across a single lenticule or lens width which, in turn, provides space for up to about 20 images at 0.833 mils per image (i.e., at a width that is greater than lower limits on width to allow effective printing). The lens arrays used with the techniques described herein can vary significantly in thickness such as a thickness of less than about 120 mils and, in some cases, less than 30 mils. Likewise, the frequency or LPI utilized may also vary with some devices having lenticular material or lens surfaces with lenses or lenticules provided at 0 to 15 LPI or in some cases 15 to 30 LPI or higher (e.g., a lens array with a thickness of less than about 120 mils and a frequency of at least about 15 LPI, a lens array with a thickness of less than about 30 mils and a frequency of at least about 30 LPI, or any other useful combination of thickness and lens frequency).

By spreading the interlaces of an image set across 3 lenticules, more interlaces can be included within the image set with rays still separated when they are distributed back to the viewer from the interlaced image through the lens array. For instance, a 62 LPI lens array when combining 3 lenses together into a lens set can hold at least about 58 individual interlaces at a lower resolution, yet the viewer is provided a specific angle for each interlace (i.e., each interlace is reflected or distributed at a unique angle or angular range), and the images can be viewed in sequence by providing a non-standard interlacing order or pattern. In order to accomplish this, a ray tracing program can be used to indicate that a new order or sequence of the images (when combining interlaces across multiple lenses rather than under a single lens) is useful because the ray tracing shows that the rays that reach the viewer will not be in sequence when a lens set is used but can be achieved by re-ordering the interlaces (or the image slices provided in the interlaces). This order or sequence will most likely be different for every lens array based upon the radius of the lens and the resulting viewing angles and number of images provided in the image set.

The advantages provided by lenticular devices of the invention include a much smaller file size required for the digital, stored version of the interlaced image, ease of printing, and the ability to get more data back to the viewer (e.g., higher limit on the number of images to include in an image set because of the larger printing width under a lens set rather than a single lens). Combining the interlaces of interlaced images of the present invention results in much smaller file size and an interlace width that can more readily be printed (e.g., printing interlace widths less than 0.5 mils is very difficult and this width may be required to try to place an image set with many images under a single lens). For instance, trying to put 58 images under a single lenticule or lens of a 62-LPI lens set would require a file size of 3,596 DPI (58×62=3,596 dots per inch). In addition, the interlace width would be about 0.28 mils which is unreasonably small for conventional printing methods. Not only is such a narrow interlace nearly impossible to image on plates or film, the lens will not focus that finely and the interlace width of 0.28 mils is too small to print well. In contrast, with the use of lens sets of 3 lenticules/set with lenticular material made to 62 LPI, the file DPI would be 62 LPI/3=20.66×58=1,198 DPI. The interlace width is 0.86 mils per image for this example. The file size and image/interlace width is reasonable for use in imaging, printing, and lens focus.

To accomplish non-integral interlacing, it is typically useful to create a specific angle for every interlace so that the image set displayed by the combination of lenses in the lens set of a lens array, in which the lenses are identical as typical of conventional lenticular material, provides a desired (e.g., a sequential) result for an output or displayed image (e.g., the specific viewing angle or direction provided by the lens set remains different for each interlace). In one embodiment, this differentiation of the rays from each interlace is achieved by choosing a fractional number of interlaces under each "member" of the lens set (e.g., the number of interlaces divided by the number of lens is not a whole number). By choosing a fractional number, specific angles for interlaces can be chosen. This process is done in some cases with a ray tracing program such as for attempting to select a number of images for optimization to map to or place under each lens of a lens set, which will likely result in minimize mixing back to the viewer.

One of the inventor's premises is that use of whole numbers (i.e., integral multiples or non-fractional numbers) in the interlaced image results in identical angles of interlaces being distributed back to the viewer. For example, when combing 6 interlaces under 3 lenses the following would occur: Lens 1 (images 1 and 2); Lens 2 (images 3 and 4); and Lens 3 (images 5 and 6). In this example, images 1, 3 and 5 would have the same viewing angle to the viewer, and those images would all be "on top of each other" in a brightness distribution plot, which would be a problem in most visual effects because a viewer would see all 3 image or rays from three image slices at the same time (or at the same viewing angle). The same thing would occur for images 2, 4, and 6.

However, an embodiment of the invention may involve using 3 lenticules in the lens sets of a lens array or sheet of lenticular material but instead of using 6 images or interlaces the lenticular device may be built with an interlaced image that includes 10 interlaces per image set. When an image set with 10 interlaces is paired with a lens set having 3 lenses, a fractional interlace is provided under each lens, and rays are dispersed from the lens array at different angles for each interlace exiting to the viewer. However, the interlace sequence would no longer be in sequence or sequential as was the case for rays in a ray tracing for a conventional lenticular device. To address this new problem or challenge, the images or rays can be traced and a new sequence created to make the animation or the 3D work as desired (e.g., to provide a sequential imaging result or output with non-sequential ordering of the images in the interlaces). Each interlace would have a slightly different angle under this approach, and this effectively separates the views through the lenses back to the viewer.

Figure 2A:
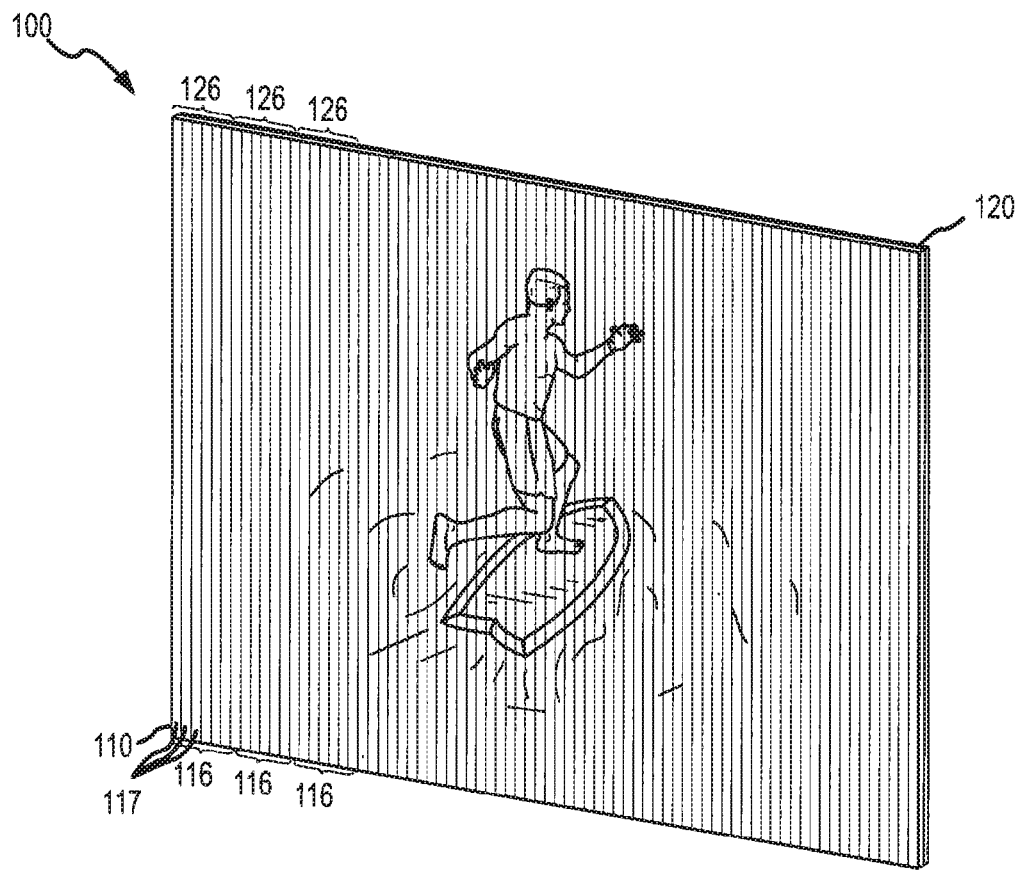
FIG. 2A is a perspective view of a lenticular device (or product or assembly) such as a label, decal, or the like that may be applied to another structure or used as a standalone image display product, with the lenticular device including a lens array or lenticular sheet/layer and an interlaced image or ink layer according to an embodiment of the invention.

FIG. 2A illustrates an exemplary interlaced image display assembly or lenticular device 100 of the present invention. The device 100 may take the form of a label, a decal, a poster, a billboard, a book cover, a media insert, print product, label (e.g., for CDs, DVDs, software, or other media product), a card (e.g., a debit, credit, smart, security, or other card), or nearly any product or device that is used to display images. The device 100 is shown to include a lens array or lenticular sheet/layer 110 that is mated with an interlaced image 120 such as by the interlaced image 120 being printed as a layer of ink onto a smooth or back surface of the device 100 distal or opposite the lens surface 110 of the device 100. The lens "array" or lenticular sheet/layer 110 is intended to be construed broadly to be a layer/sheet or layers/sheets of a material such as plastic, glass, ceramic, or other transparent to translucent material along with a lens surface formed on one side and a smooth or textured side opposite the lens surface (e.g., a layer of lenticular material with a wide range of LPI being useful in embodiments of the invention).

The lens array 110 includes a number of lens sets or sets of lenticules 116 that extend across one of the surfaces of the lens array 110 (or may be provided in a select portion of the lens array or lenticular layer 110). The lens sets 116 illustrated each include a number or plurality of linear or elongated lenses or lens elements 117 that may take the form of conventional lenticules or optical ridges. For example, but not as a limitation, each lens set 116 may include 2 or more lenticules or lenses with some embodiments illustrated herein including 3 lenses in each set 116, but, with the teaching provided herein, those skilled in the art will readily understand that the number of lenses in each set may be increased to practice the invention such as by including 4 to 10 or more lenses in each set 116. The lenses 117 and useful configurations for the lens set or microstructures 116 are explained in more detail below, but, in many embodiments of the invention, the lenses 117 are conventional lenticules provided on the surface of the lens array 110 with each lens 117 being substantially identical in configuration (e.g., having a similar cross-sectional shape).

The interlaced image 120 is printed onto or applied to the lens array 110 such that its sets of image slices or interlaces 126 are mapped or paired to the lens sets 116, e.g., with a non-integral number of interlaces or image slices being provided under or opposite each lens 117 and the number ranging from a few images such as 3 (such as when a lens set 116 has two lenses 117) up to 70 or more interlaces (such as when the number of lenses 117 in a lens set 116 is larger to provide a larger width to support interlace printing). The concept of "non-integral" as intended in this description is explained in more detail below, but generally is intended to mean that instead of each lens in a lens array focusing on a complete set of interlaces or a set of lenses 117 is used to focus on such a complete set of interlaces 126. Further, the number of lenses 117 in the set 116 and the number of interlaces in the image set 126 are selected such that a whole number of interlaces is not provided under each of the lenses 117 in the lens set 116 (e.g., the number of interlaces under each lens 117 will be fractional such that some interlaces are actually under neighboring lenses 117 in the set 116). The width of the lenses 117 and image slices 126 is shown to be much larger (or not to scale) in FIG. 2A as the lenses 117 may be provided at 10 to 100 or more LPI and will often be less than 50 mils in width such as less than about 20 mils when LPI increases over 50 LPI such as in the case of 62 LPI lens array 110 corresponding to the example provided in the background that would have lenses 117 with widths of about 16.66 mils across each lenticule.

Figure 2B:
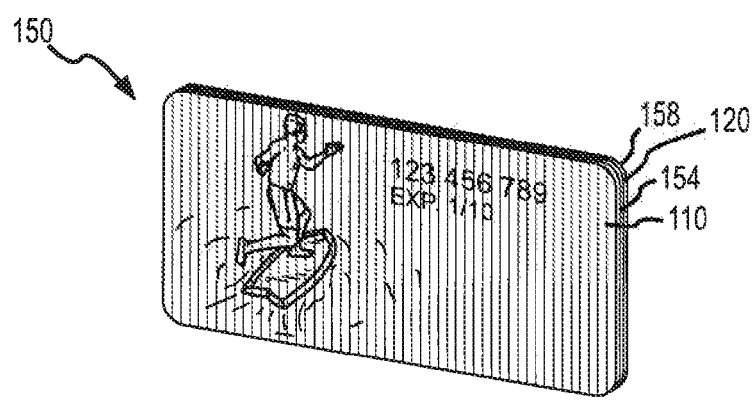
FIG. 2B is a perspective view of a lenticular device similar to FIG. 1A but further including an adhesive layer between the lens array and the interlaced image and a substrate upon which the image is printed or provided, with the adhesive layer being provided on either or both the lens array or the interlaced image (e.g., the lenticular device may be adapted for use as a gift card, a credit card, a debit card, or other similar card such as by providing data encoding with a magnetic strip in the substrate or other layers opposite the lens array or lenticular layer.

Rather than printing directly on the lens array 110, it may be desirable to form lenticular devices by applying an interlaced image on a substrate or with a plastic, paper, or other backer or liner onto the lens array 110. FIG. 2B illustrates such an image display assembly or lenticular device 150 of the present invention. In the device 150, the lens array or lenticular layer 110, which is configured with lens sets 116 (e.g., is formed to contain a plurality of lenticules or lenses with these later being assigned to a lens set 116 by mapping of an image set or set of interlaces 126 to that group or set of lenses 116), is bonded to a substrate 158 such as a paper, plastic, or other material(s) sheet. The bonding is achieved with an adhesive 154 that may be applied to either the lens array 110 or to the substrate 158 as is well known in the laminating and related arts. For example, thermal laminating processes may be used to form the device 150 with the adhesive 154 being a layer of thermally activated adhesive applied to either the lens array 110 or more commonly to the substrate 158. The adhesive 154 is activated by heat, and the array 110 and substrate 158 are mated together with pressure such as pressure applied by a conventional nip roller or by other pressure-applying machinery. The interlaced image 120 is applied or printed onto the substrate 158 prior to the bonding process and the bonding is performed to carefully map or pair the sets of image slices or interlaces with the lens sets 116 and the lenses 117 in each set 116. The lenticular device 150 may be a standalone product such as a smart or credit/debit card or may be applied to another structure as a label, cover, decal, or the like.

FIGS. 2C-5 provide additional examples of products in which the assemblies or lenticular devices 100 (or 150) may be used to practice the invention. FIG. 2C illustrates the use of the device 100 provided on a sidewall 210 of a package 200 between sealed ends 204, 208. For example, the package 200 may be a foil snack bag or a plastic or paper bag used to package food, retail products, or the like. The lenticular device 100 may be applied as a decal or label to the sidewall 210 or be provided as an integral portion of the sidewall 210. FIG. 3 illustrates similar packaging 300 for a retail product such as a food product. A lenticular device 100 is applied to or provided as an integral portion of the sidewall 310 between sealed ends 304, 308, and the sidewall 310 may be formed of a metallic foil, plastic, paper, or the like as is commonly used in the packaging industry. FIG. 4 illustrates a book, notebook, magazine, or the like 400 with pages 410 enclosed or bound to cover 412 with front and back members 414, 416. The lenticular device 100 with the lens array or lenticular layer 110 and a matched interlaced image (with non-integral interlacing according to the invention) is attached to the cover 412 on one or both members 414, 416 (e.g., front and back covers of a book, book jacket, magazine cover, notebook, or the like) or formed as part of the cover 412 (e.g., the lens array 110 may be provided as part of the process to form a notebook cover or book jacket or the like).

FIG. 5 illustrates a container 500 (shown as a bottle but could be a can, jar, jug, or any other container) with a sidewall 510, and a lenticular device or assembly 100 is attached to the container sidewall 510 such that the interlaced image is visible through the lens array 110 with its lenses provided in lens sets 116 (which are shown significantly out-of-scale to allow them to be shown in the figure but, again, the width of each lens will be less than 100 mils and more typically less than 20 mils such that a lens set with 2 to 20 or more lenses at 10 to 100 or more LPI will be relatively small in its width, too). As discussed below, the lenticular devices or assemblies 100, 150 are often particularly useful in packaging or products such as those shown in FIGS. 2A-5 because the overall thickness can be controlled to provide viewing of an interlaced image with a thin or even ultra thin lens array or lenticular sheet/layer 110 (e.g., less than about 15 mils in some cases and, in some embodiments, a thickness selected from the range of about 10 mils to about 3 mils or less).

The prior art device 10 shown in FIG. 1 is a relatively simple lenticular assembly in which only 3 interlaces 22 were placed in each image set under the lenticules 16. This small number was chosen to allow a relatively simply ray tracing to be shown to illustrate the viewing angles or directions provided by each lenticule 16 and how these were similar for the interlaces 22 associated with each image because the interlaces associated with that image were positioned or mapped to a similar portion of each lenticule (e.g., a first image or frame is always provided on the right hand side of the lenticule 16 to have its rays directed toward the right such as at an angle of negative 20 to negative 45 degrees or the like). More commonly, many more interlaces 22 will be provided under each lenticule 16, which makes it more difficult to analyze the ray traces. Instead, the image produced or the functioning of a lenticular device can be analyzed with a brightness distribution plot that plots ray intensities or brightness against the ray's distribution or viewing angle (or position).

Figure 6A:
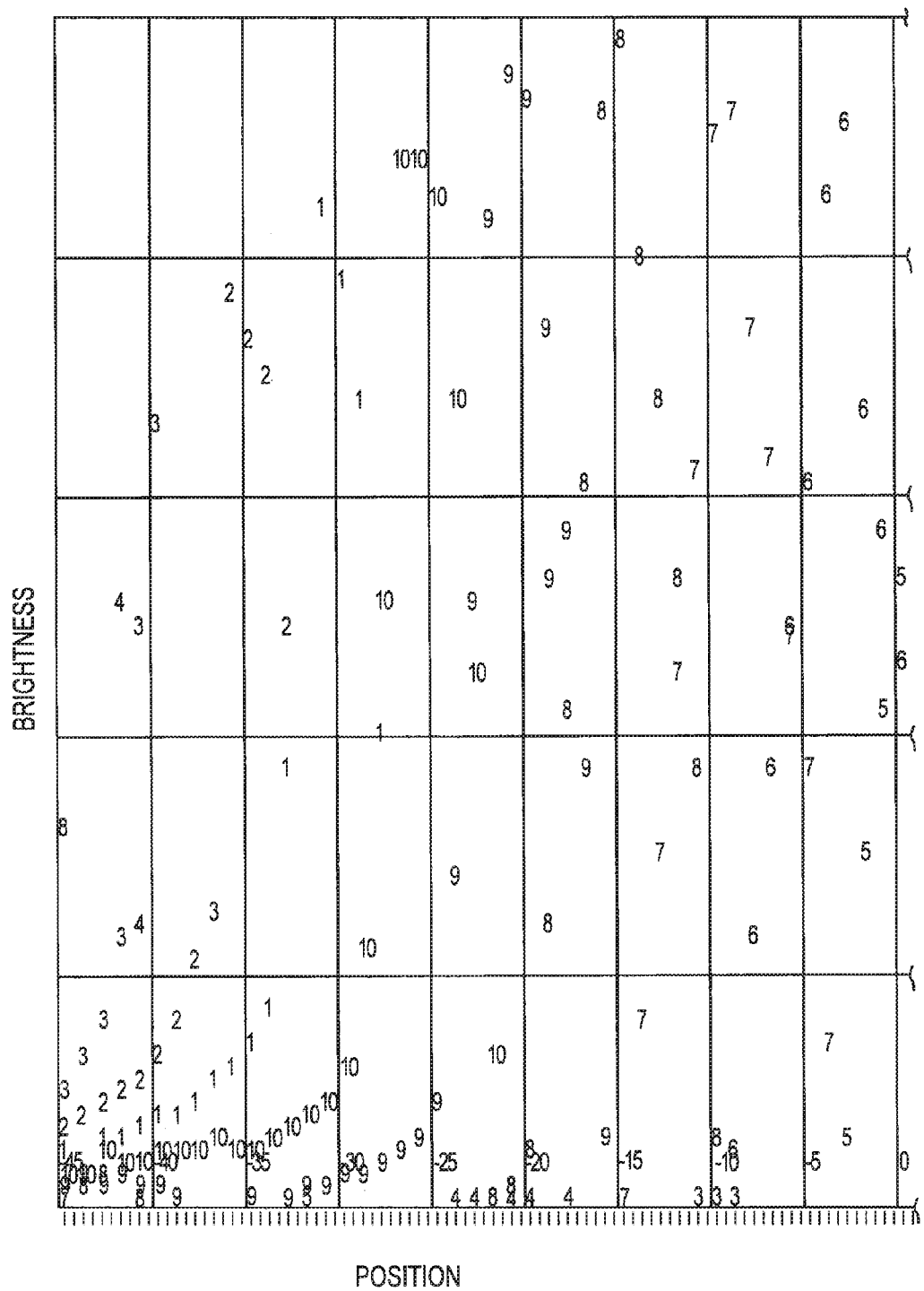
FIGS. 6A-6B illustrates a brightness plot of a conventional or prior art lenticular device in which ten interlaces are provided under each or are paired with each lenticule or lens.
Figure 6B:
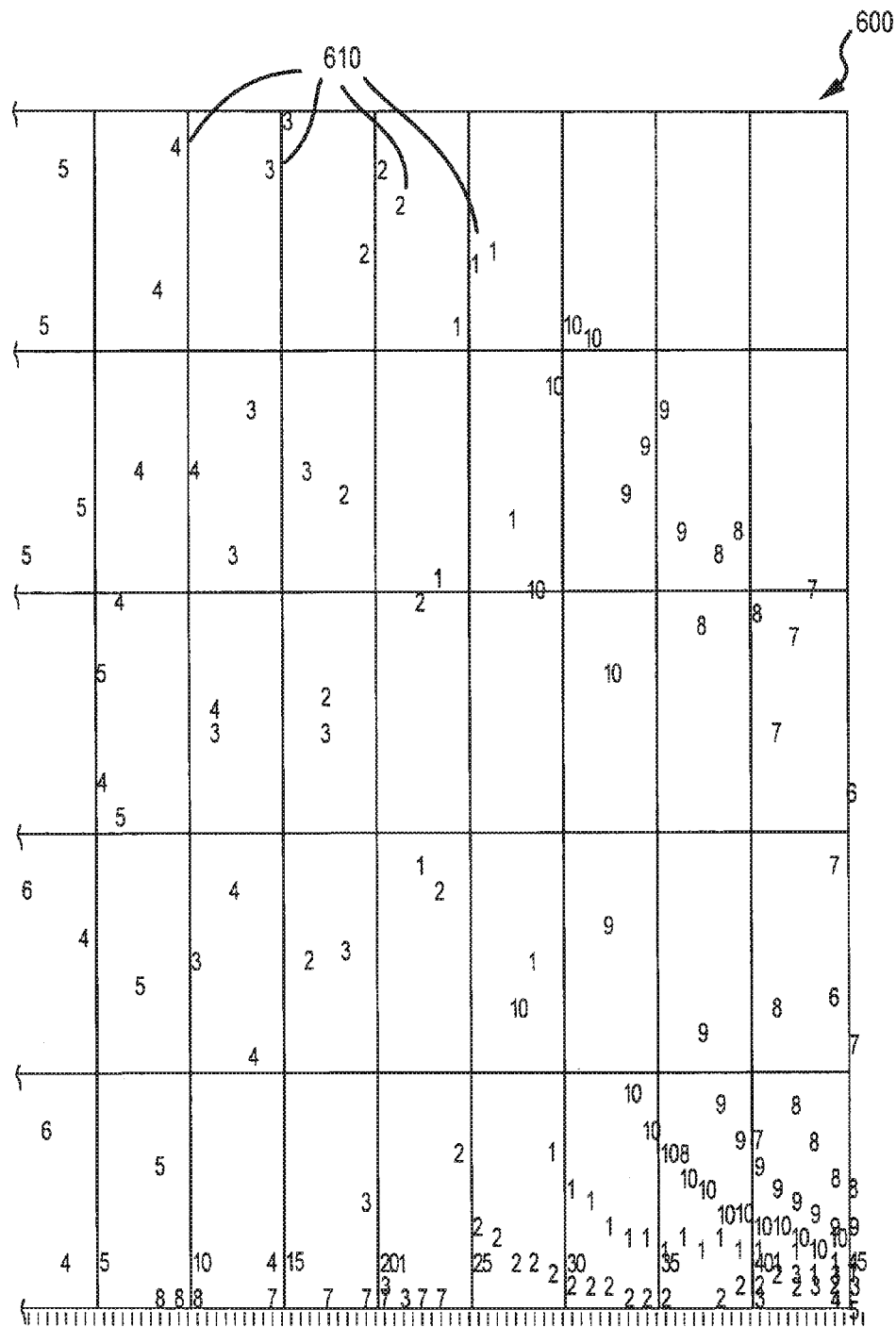

FIG. 6 illustrates a brightness plot 600 for the lenticular device 10 of FIG. 1 when the interlaced image 20 is modified to provide 10 interlaces underneath each lenticule 16. Incident rays to the lenticule from the image surface were traced from ±45° at 0.1 degree steps. In addition, the source of the rays was one tenth of the width of the width of the lenticule 16 (assumed to be 16 mils in this case) and seventeen steps were made across each interlace 22. As a result, 153,000 rays (17×10×900) were traced in the calculation used to create the brightness distribution plot 600. The images on or provided on the ten interlaces were numbered sequentially 1 through 10. A review of the plot 600 and the brightness values associated with these numbered interlaces as shown at 610 (with greater brightness values 610 in the upper regions of the plot 600 having more relevance to the resulting or visible imagery) indicates that the rays associated with the interlaces and associated images are sequential and spaced apart (e.g., shown in inverse order from left to right in the viewing angle of the lenticular device) to produce a desired visual effect such as sequential viewing of images 1 to 10 as the lenticular device is rotated (or the viewer moves their viewing position).

As discussed previously, using a single lenticule for each image set or set of interlaces can make it very difficult to provide a large number of interlaces because the width of each image slice becomes quite small (e.g., sometimes approaching 0.5 mils or less). This is even a more serious problem as either the number interlaces significantly increases (e.g., when 30 to 50 or more interlaces are provided to achieve a desired visual effect) or the LPI is increases such that the lenticule width significantly decreases as this forces conventional interlaces to have to be smaller in width, too.

To address these issues, embodiments of the present invention differ from conventional lenticular devices by utilizing lens sets of 2 or more lenses to view each image set or set of interlaces. In other words, an image set of 2 to 60 or more interlaces is mapped to more than one lenticule in the lens array or lenticular layer such as to 2 or more lens. According to another feature, the interlaces are selected to have a number that is not integral with the number of lenses in the lens set such that a whole number of interlaces is not provided under any of the lenses but instead a fractional number is provided (such less than one, one to two, two to three, and the like). This results in some of the interlaces actually being displayed by two of the lenses and has the beneficial function of providing a desired spacing between rays rather than allowing rays to mingle or mix, which can ruin an image or reduce its clarity.

Further, the pitches of the interlaces are purposely made non-integral multiples of the lenticular pitch in most embodiments, and the interlaces are spread out over several lenticules instead of a single lenticule. One result is that the rays from the interlaces exit different parts of the lenticules over several lenticules instead of similar parts of different lenticules as is the case in the usual lenticular printing process or devices. The exiting slopes are thus different for the rays causing the exiting rays to have different viewing or distribution angles. Because the interlaces are spread out over several lenticules, the constraints on the printing of the interlaces are lessened. This allows a finer pitch lenticular structure to be used for a given printing process so that the limitations of the printing process can be overcome. The finer than normally-used lenticular pitch means that the thickness of the lenticular layer or lens array can be scaled allowing a thinner sheet of lenticular material to be used than possible with more conventional lenticular devices, which results in a cost saving and opens up new applications for lenticular devices formed according to the invention such as where thinner, flexible materials are used and/or required.

Figure 7:
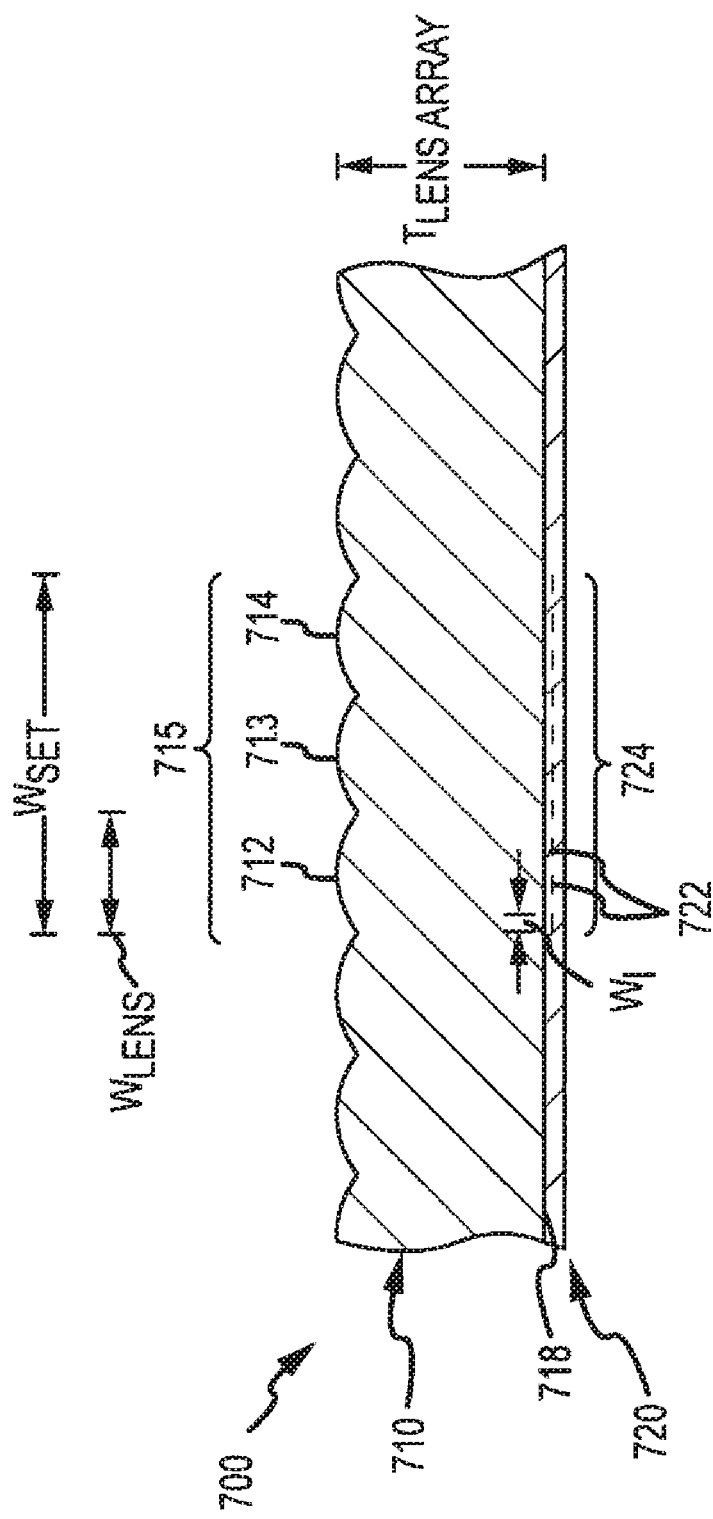
FIG. 7 illustrates a cross section of one embodiment of a portion of a lenticular device or image display assembly using lens sets each having three lenticules or lenses to display or focus upon ten interlaces (i.e., the image set or set of interlaces includes 10 image slices) such that each lens is paired with a fractional number of interlaces (i.e., about 3.333 image slices or interlaces)

FIG. 7 illustrates a portion of a lenticular device 700 according to one embodiment of the invention. The portion is selected to provide details or configuration of a representative lens set and paired image set and a similar arrangement would be repeated across the lenticular device 700. As shown in this example, the lenticular device 700 includes a lens array or lenticular sheet 710 with a plurality of lenticules or lenses provided on one side (as shown with lenses 712-714) with a planar side 718 opposite. The thickness of the lens array, $t_{LENS\ ARRAY}$, may vary to practice the invention such as from a few mils to 20 or more mils. An interlaced image (or ink layer) 720 is provided upon or mated with the planar side 718. The lens array 710 is divided into lens sets 715 that each includes 3 lenses or lenticules 712, 713, 714 in this example. The interlaced image 720 is configured with non-standard interlace ordering or a non-integral image pattern such that an image set 724 of interlaces 722 is mapped to each lens set 715 rather than to a single lenticule. The image set 724 is shown as including 10 interlaces or image slices 722 each with an interlace or image width, $w_I$, that can be significantly larger than would be the case if 10 interlaces were placed under a single lens. For example, each interlace 722 may have a width, $w_I$, equal to about the width of the lens set, $w_{SET}$, divided by the number of interlaces 722 (i.e., by 10) rather than a width equal to about the width of one lens, $w_{LENS}$, divided by the number of interlaces as in conventional devices. In this example, this results in an interlace width that is increased by 3 times while in other examples using more lenses the increase in width may be even more dramatic. The increased width may significantly simplify printing processes or, as described in later example, allow a much larger number of interlaces be included in each image set while still allowing effective creation and printing of the interlaced image 720.

Figure 8:
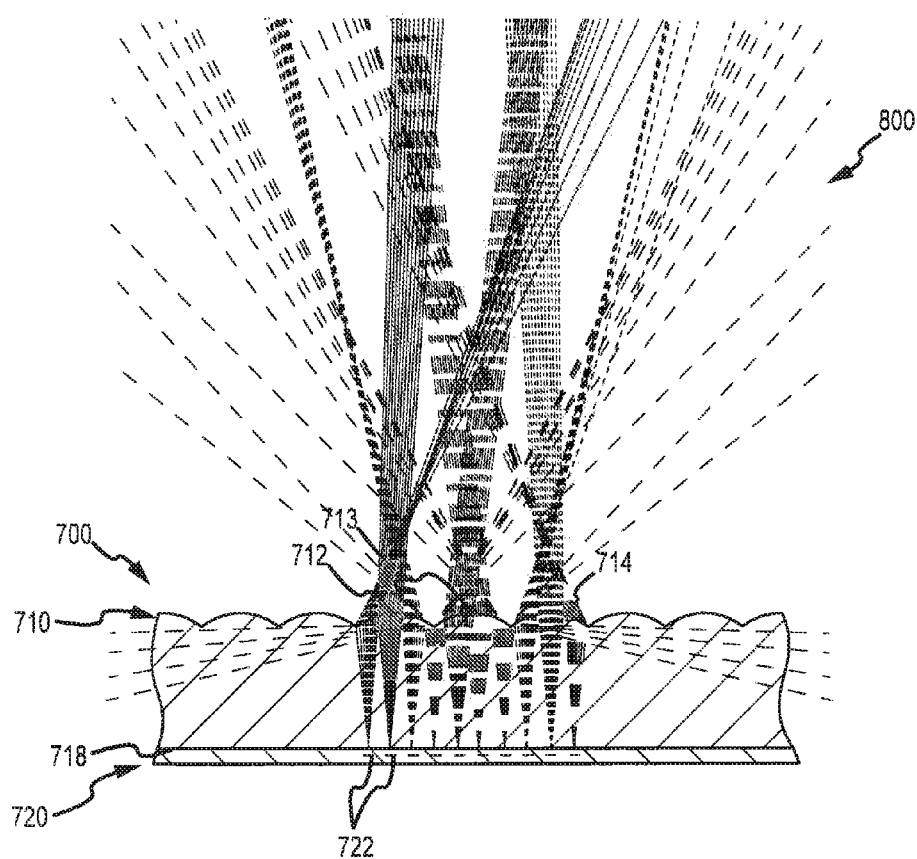
FIG. 8 a ray tracing for the lenticular device of FIG. 7 showing the effectiveness of having using more than one lens (i.e., a lens set) focus on a set of interlaces rather than only providing a single lenticule or lens for each set of interlaces as is the case for conventional lenticular devices or assemblies.
Figure 9A:
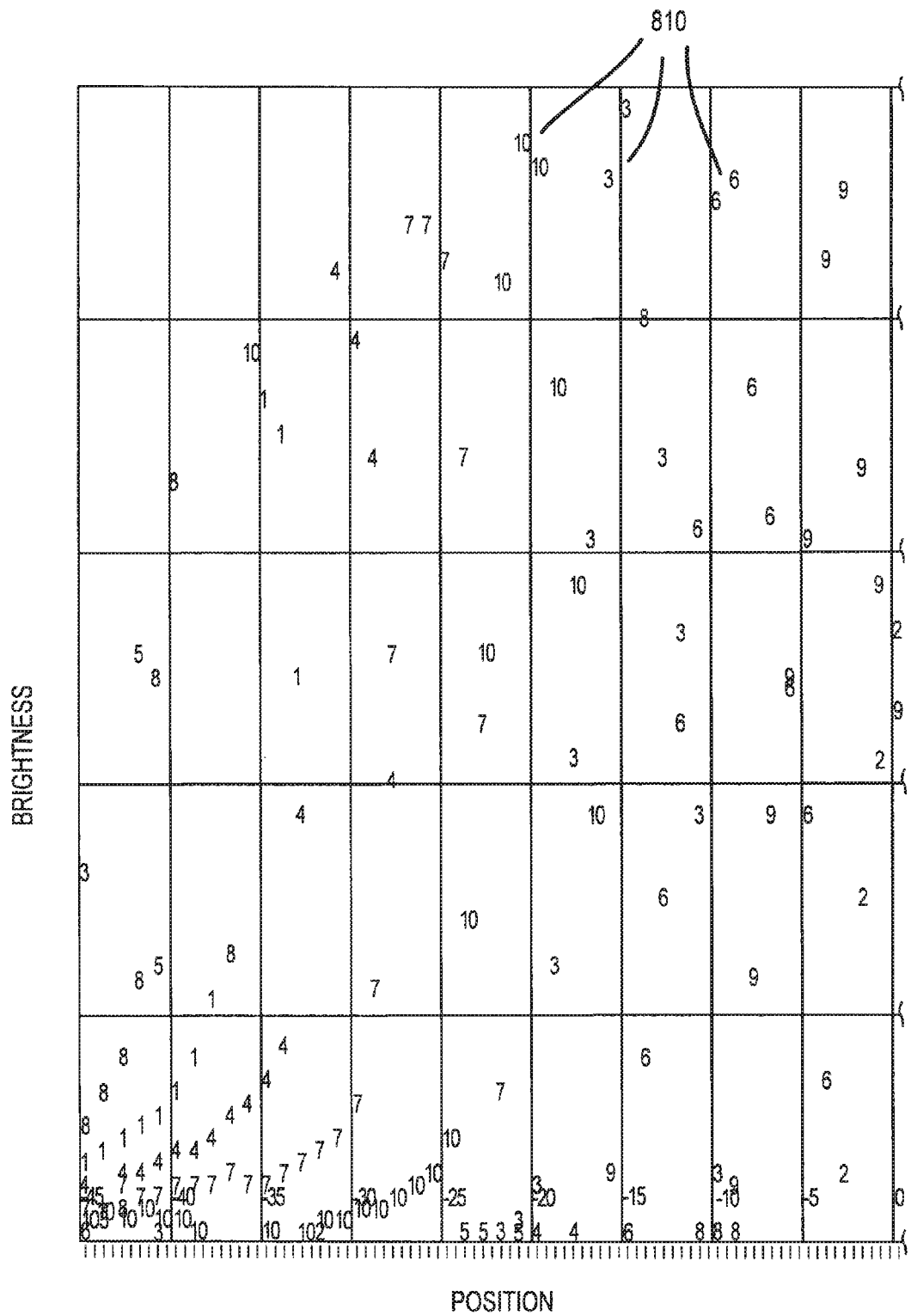
FIGS. 9A-9B illustrates a brightness plot for the lenticular device of FIG. 7 when the interlaces are provided with a conventional ordering or a sequential order showing an undesirable mixing of the images in the output of the lens set.
Figure 9B:
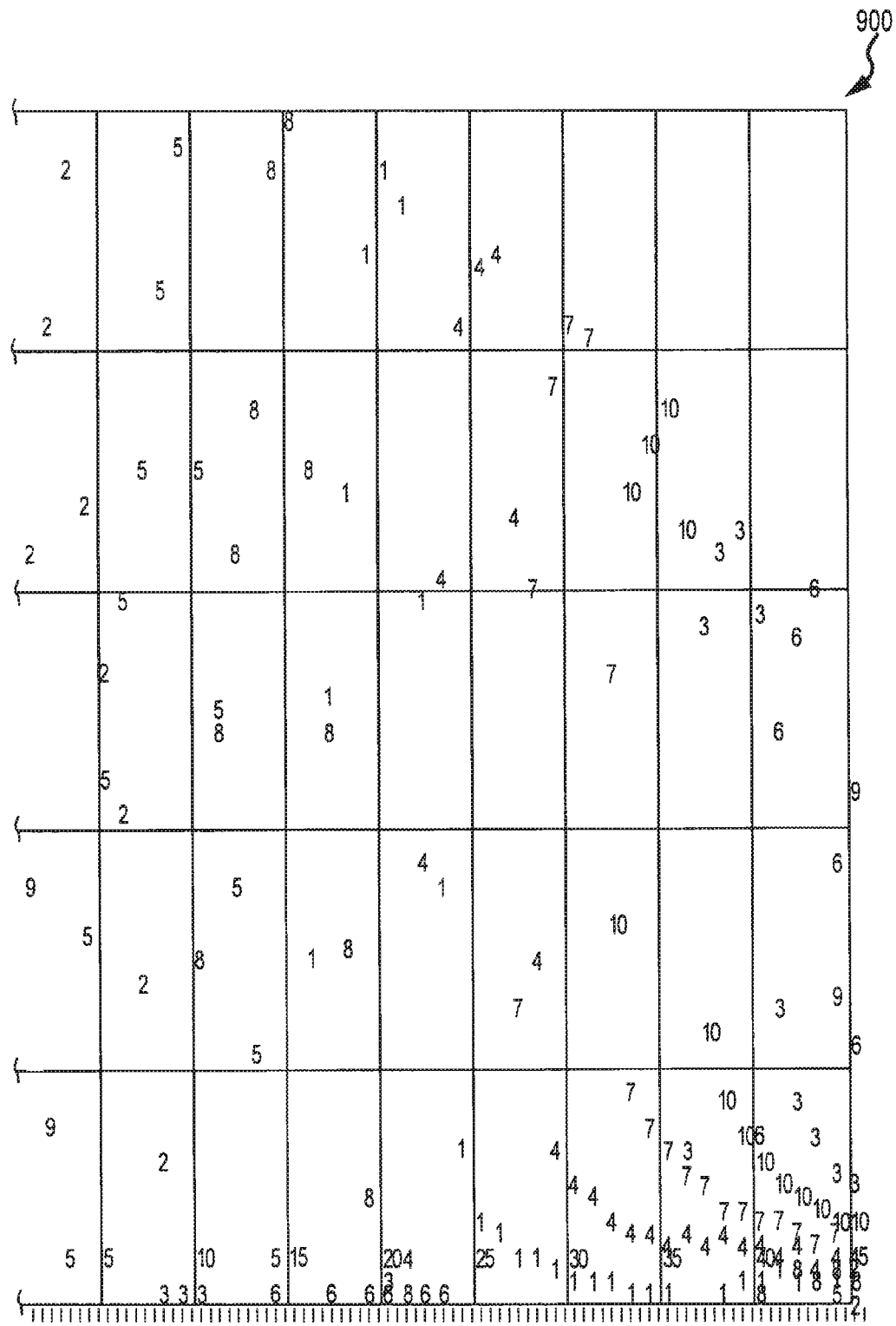

FIG. 8 illustrates a tracing of rays 800 for the lenticular device 700 when conventional, sequential ordering of the image slices or interlaces is utilized. The trace 800 shows how the rays for the ten interlaces are deviated to the viewer area. Because the interlaces are not presented under a single lenticule, the rays associated with images on the interlaces are no longer related in a simple manner but instead are distributed or directed from the lens array 710 in a manner that makes causes undesired mixing and blending when the interlaces are ordered sequentially. Normally, when counting from one end such as the left end, the first interlace would be formed to include a slice of a first image, the second interlace would include a slice of the second image, and so on. But, viewing the angular distribution for the lens set 715 shown by tracing 800 of FIG. 8 indicates that the ordering of the images may need to be changed to keep a desired image effect. FIG. 9 illustrates a brightness distribution plot for the lenticular device 700 where the interlaces 722 are provided in sequential order.

As shown with brightness values 810, the image slices associated with the interlaces 722 in this case are not sequential but, instead, are jumbled or mixed in a manner that may in some cases be acceptable but typically will not be desired (e.g., typically want the images to be sequential across the ray tracing or brightness plot). It should be noted, though, that the use of a non-integral number of interlaces 722 relative to the number of lenses 712, 713, 714 in the lens set 715 does provide the desired separation or unique viewing angle or distribution for each of the interlaces 722. As a result, the lenticular device 700 provides a unique imagery or display by pairing lens sets rather than single lenses with image sets having a number of interlaces 722 that are non-integral (or that result in a non-whole number of interlaces being viewed through any particular one of the lenses).

Figure 10A:
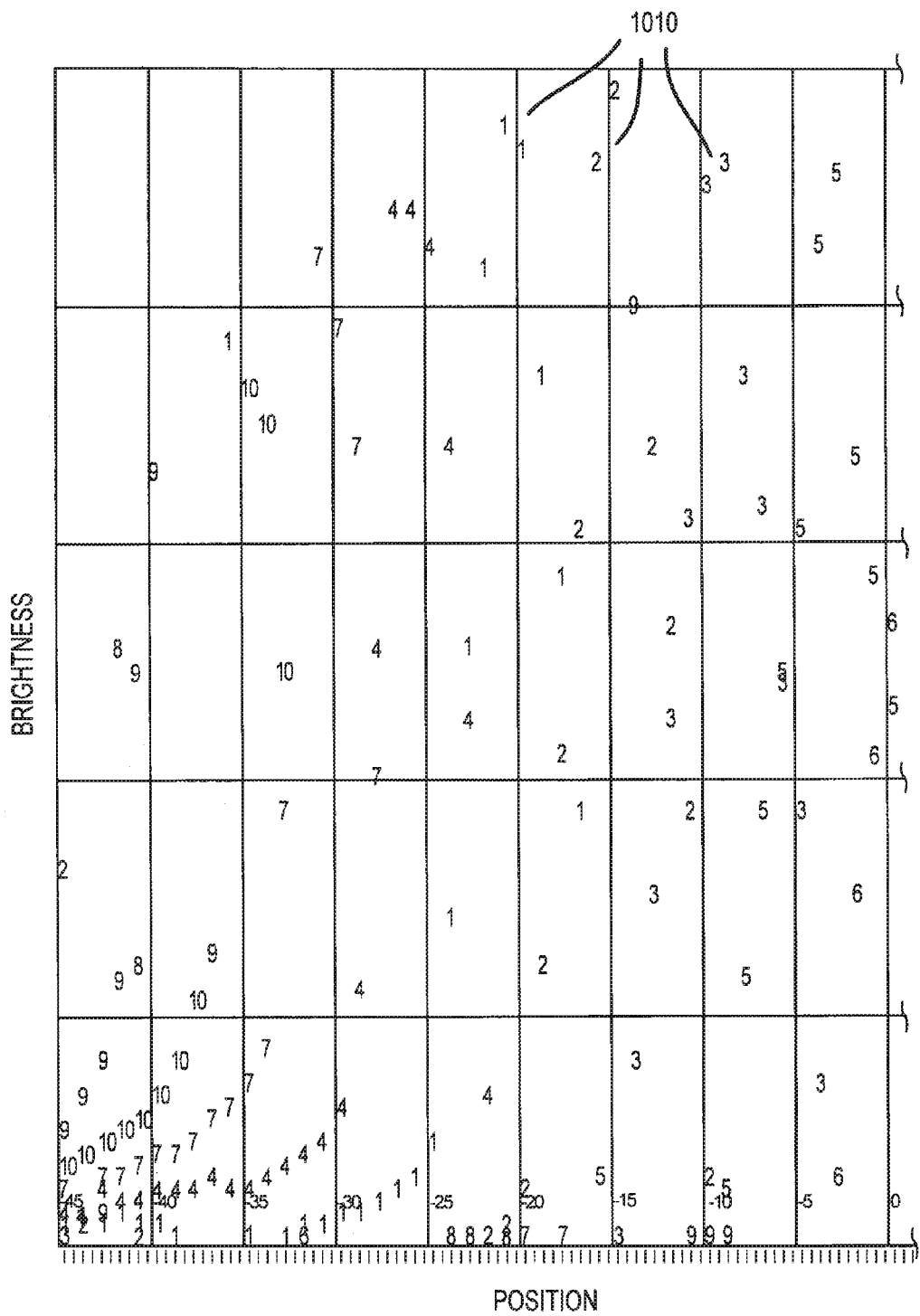
FIGS. 10A-10B illustrates a brightness plot for the lenticular device of FIG. 7 when the image set or set of interlaces is rearranged into a non-standard ordering or pattern that produces a desired relationship among the images in the output of the lens set (e.g., the rays associated with each interlace are spaced-apart and presented in a sequential order from the first image or interlace to the tenth image or interlace)
Figure 10B:
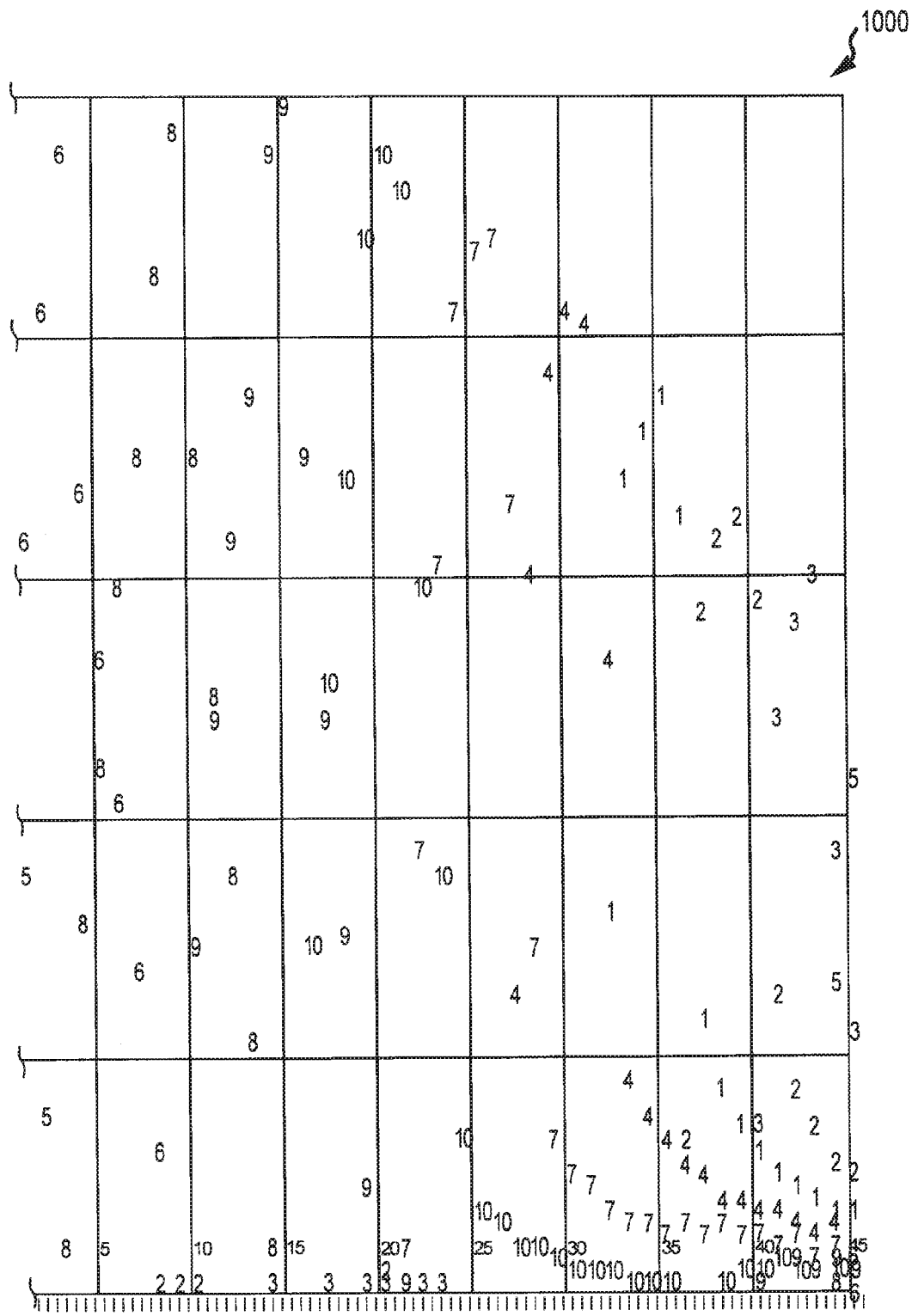

The inventors recognized, however, that the interlaces 722 can be provided in the image set 724 such that they are visible through the lens set 715 in a sequential order (e.g., from a first image or frame to a last image or frame). In this example, the order relationship, interlace ordering, or interlacing pattern was changed from 1, 2, . . . , 9, 10 to 10, 3, 6, 7, 9, 2, 4, 5, 8, 1 (with the numbers representing the image slice provided at each interlace 722 from left to right). FIG. 10 illustrates a brightness distribution plot 1000 for the lenticular device 700 in which the interlaced image 720 is configured such that the image set 724 includes interlaces 722 that are ordered with this modified or non-standard pattern, and as shown by brightness values for the images or interlaces 1010 the interlacing pattern results in the image slices being displayed in a sequential order (e.g., ascending order from 1 to 10 but in some cases it may be desirable to provide a descending, sequential order or some other useful sequence or pattern) across the angular distribution of the lens set 715. Additionally, the use of a non-integral number of interlaces 722 (i.e., 10 interlaces in this example) relative to the number of the lenses 712, 713, 714 (i.e., 3 lenses) results in the rays associated with each interlace being grouped along a viewing angle (or angular range) that is substantially unique (e.g., little or no bleeding from adjacent ones of the image rays as 10 divided by 3 or 3.333 image slices are placed under each lenticule).

For movie or motion imagery or displays, it may be desirable to provide a lenticular device similar to device 700. In this case, many image or frames are needed to show animation or a few seconds of a movie or the like. Hence, instead of 10 images which corresponds to 10 interlaces 722 in each image set 724 the image set 724 may be provided so as to include 30 to 50 or more interlaces 722. Using a prior example, 58 interlaces 722 may be provided while still using a lens set 715 with 3 lenticules 712, 713, 714. The use of lens sets 715 rather than a single lens to display an image set makes printing much more practical as for the same lens array 710 the interlace width, $w_I$, is significantly increased. For example, each lens 712, 713, 714 may have a pitch or width, $w_{LENS}$, of about 16 mils or about 16.7 mils but by using the lens set 715 to display the image set 724 the pitch or width, $w_{SET}$, available to the image set 724 is tripled such that the interlace width, $w_I$, is also tripled, which allows printing even at a relatively high LPI (or lens frequency).

Figure 11A:
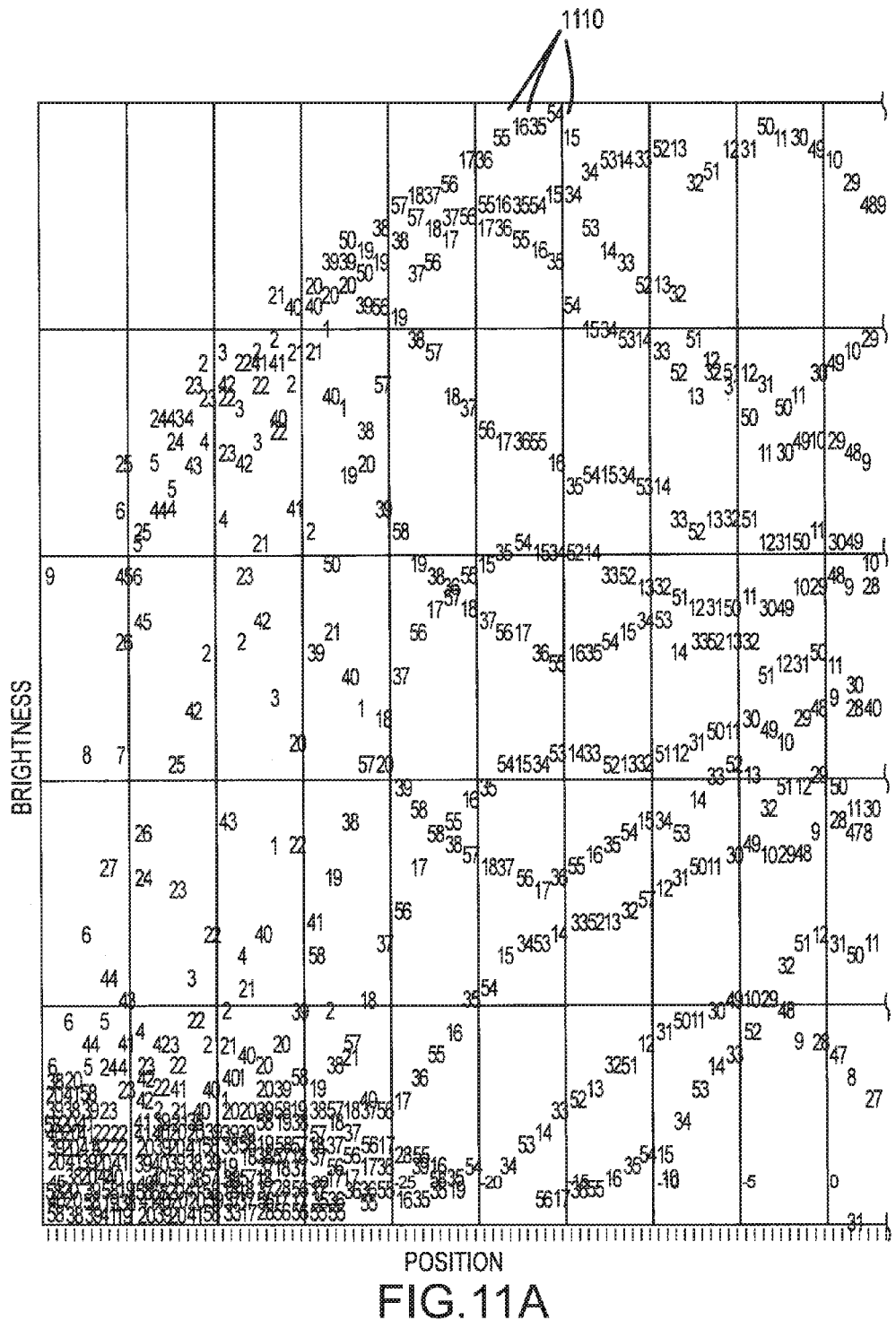
Figure 11B:
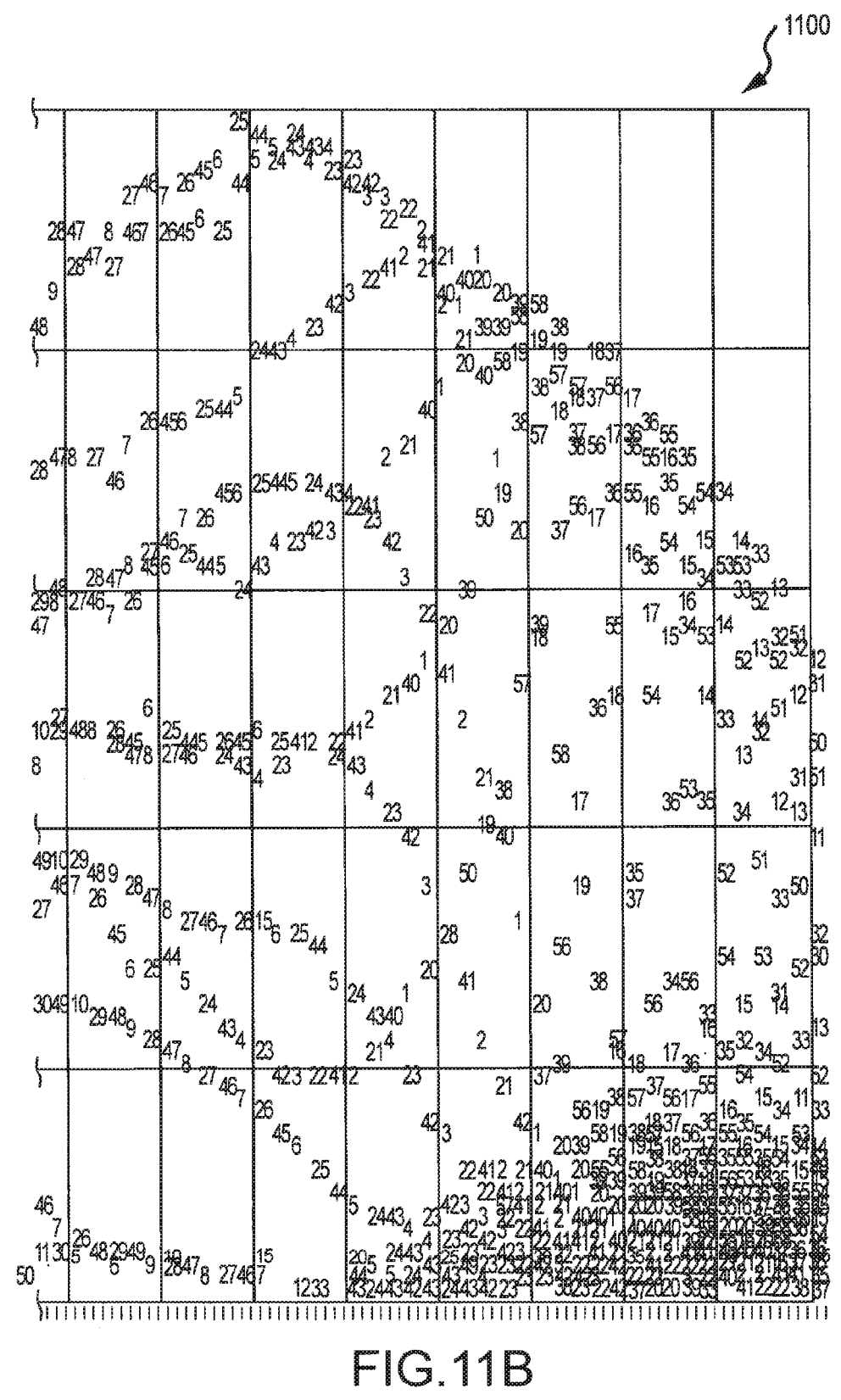

FIG. 11 provides a brightness distributed plot 1100 for a lenticular device, such as device 700, in which the lens set 715 includes 3 lenticules 712, 713, 714 and the image set 724 includes 58 of the interlaces 722 with substantially equal widths, $w_I$, and with the plot 1100 being based on a trace of over 50,000 rays. The interlaces 722 are provided in standard sequential order and this results in a lack of sequential ordering as shown with brightness values 1110.

Figure 12A:
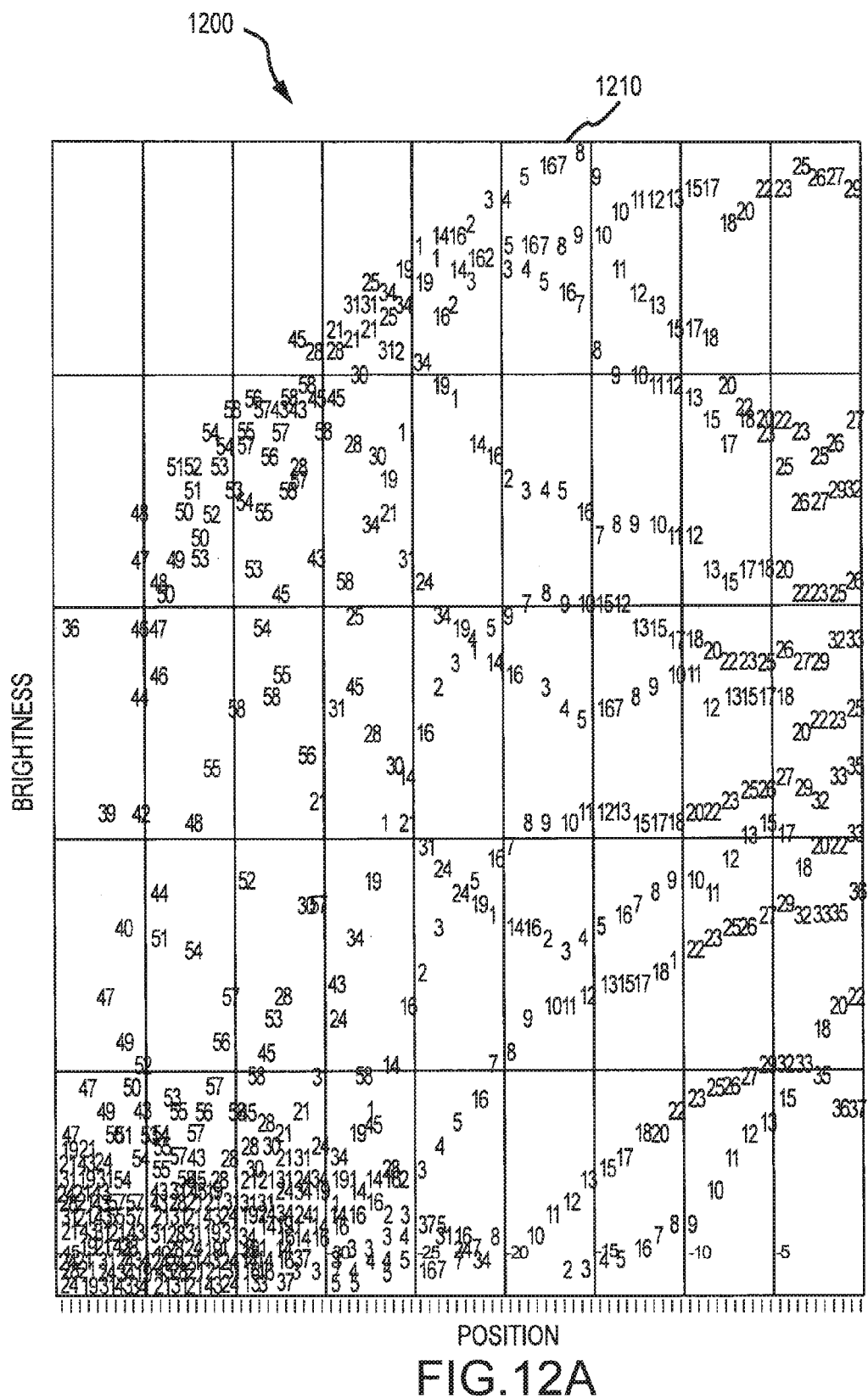
Figure 12B:
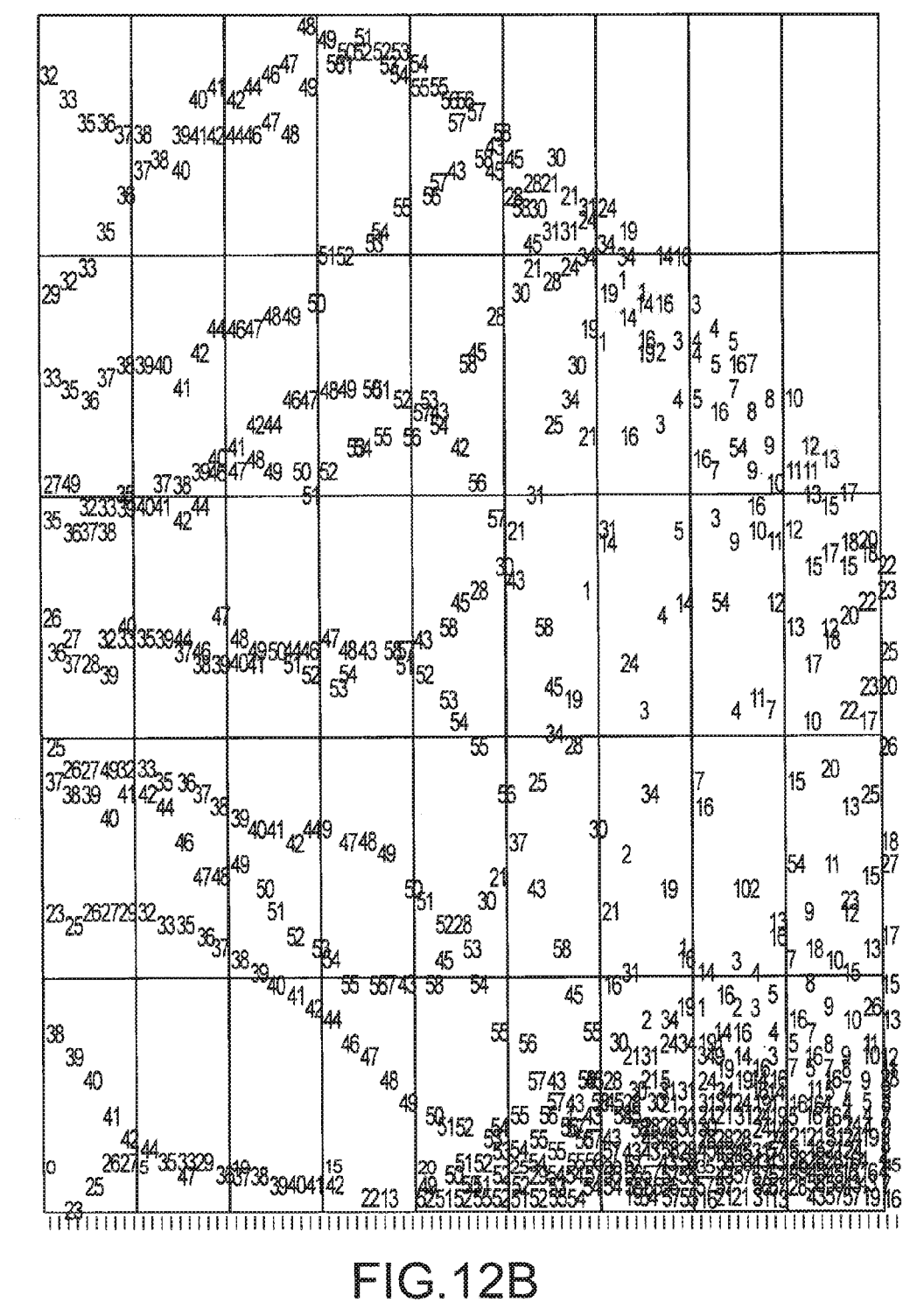

If sequential ordering (such as ascending order) is desired, a sorting of the interlaces (or the image slices provided on each interlace) may be performed. One such non-standard interlacing pattern or order was completed for the 58 interlaces, and a brightness distribution plot 1200 is shown in FIG. 12 showing the brightness values 1210 with a sequential order for the reordered interlaces 722. Sequential ordering is typically desirable for proper motion displays, and the assignment of images can be performed using a computer program to assign the images or image slices to particular interlaces. A program listing is provided at the end of this description that used brightness calculations among other parameters to assign the images such that the ray tracings (and brightness distribution) is in a sequential order with each ray directed a particular angle that is unique for the interlace.

The image sorting algorithm or program produced the following sort where the first value is the interlace, the second value is the image or frame that is the source of the image slice or data, and the third value is the angle at which the image or rays are projected to the viewer rounded to the thousandths of a degree (e.g., a step or portion of a larger viewing angle defined or associated for the lens set or over a small viewing angle/direction that differs but is adjacent or near (and sometimes overlapping somewhat) the next or adjacent interlace image or rays): 1, 55, −22.791; 2, 56; −22.404; 3, 52, −22.366; 4, 49, −22.599; 5, 46, −20.82; 6, 43, −20.655; 7, 40, −20.043; 8, 37, −19.234; 9, 33, −18.132; 10, 29, −17.045; 11, 26, −15.831; 12, 22, −14.760; 13, 19, −13.621; 14, 16, −12.481; 15, 13, −11.447; 16, 10, −10.555; 17, 7, −9.408; 18, 2, −8.603; 19, 6, −7.751; 20, 35, −6.847; 21, 58, −6.038; 22, 53, −5.170; 23, 50, −4.329; 24, 47, −3.609; 25, 44, −2.667; 26, 41, −2.562; 27, 38, −1.686; 28, 34, −0.851; 29, 31, 6.198E-02; 30, 27, 0.1; 31, 23, 0.897; 32, 20, 1.773; 33, 17, 2.609; 34, 14, 3.539; 35, 11, 4; 36, 8, 4.256; 37, 4, 5.25; 38, 3, 5.979; 39, 30, 6.783, 40, 57, 7.675; 41, 54, 8.621; 42, 51, 9.620; 43, 48, 10.664; 44, 45, 11.700; 45, 42, 12.621; 46, 39, 13.809; 47, 36, 15.013; 48, 32, 16.275; 49, 28, 17.329; 50, 24, 18.532; 51, 21, 19.371; 52, 18, 20.148; 53, 15, 20.949; 54, 12, 21.519; 55, 9, 22.257; 56, 5, 22.257; 57, 1, 22.373; and 58, 25, 22.761.

Of course, it will be understood by those skilled in the art that the sorting algorithm as well as the brightness distribution plots (and/or brightness values used in the sorting algorithm) should be run for each lenticular array 710 configuration to take into account lens radii, number of lenticules in each lens set, width of lenticules and/or LPI, the thickness of the lens array, the material used for the lens array (e.g., the Index of Refraction of the lens array), and the like and to take into account the number of interlaces 722 provided in the image set 724. Each such sorting run in which parameters are altered will likely produce a differing interlacing order or pattern for the interlaces 722 in the image set 724 to produce a sequential output in the displayed image or image visible to a viewer.

Referring again to FIG. 7, the lenticular device or display assembly 700 includes a lens set 715 in a lens array 710 with a first side or surface including lenses 712, 713, 714 and a second side or surface 718 that may be smooth or textured and upon which a printed image 720, such as an interlaced image, is printed (or applied with an adhesive such as shown in FIG. 2B). Generally, the process of forming the assembly 700 includes using a high or even the highest practical resolution interlaced image 720 that can be printed and designing a lens for inclusion in the lens set 715 for each interlaced image slice or element 722 in an image set 724. Each lens set 715 sends light from the paired slices (e.g., whole and fractional portions of image slices) 722 underneath it or adjacent in pre-defined directions. A lens array 710 made of lens sets 715 can be made thin enough to be used as a wrapping material or as thin as paper to be applied to another structure or provided along whereas conventional lenticules are often too thick and have more limited uses. Hence, the cost of material for a lens array 710 formed from a plurality of lens sets 715 with paired non-integral interlaced images 720 may be a fraction of the material cost for lenticular material with convention interlacing, which allows the display assembly 700 to be used to meet the large market demand for labels and other thin packaging products that can be used to display interlaced images with motion, 3D, and flash imagery.

It can be seen from the above discussion that one concept of the invention is that in the generation of images and interlaces involves use of the varying relationships between interlace positions and lenticule positions to produce angular distributions of images. This is unconventional because the normal procedure is to use interlaced images in serial order through single lenticules to provide angular distribution of images to the viewer. An advantage gained in the non-integral techniques described herein is that much thinner lenticular structures can be used compared to the structures in the conventional process of lenticular printing and displays, and this results in significant cost savings and opens up new opportunities in displays such as for advertising and other uses that would not have been considered previously due to the limitations of conventional lenticular material and printing processes.

Conventional interlacing slices parts of images and prints them in order on a substrate in relationship to the lenticular structure being used to display the images. For example, a sequence of 10 interlaces might be spaced 2 mils apart to form a pattern of a 20-mil pitch for a 50-LPI lenticular structure (e.g., the 50-LPI lenticular structure having a 20-mil pitch). The sequence of images on the interlaces would be 1, 2, 3, 4, 5, 6, 7, 8, 9, 10. In contrast, the interlacing techniques taught herein in which the interlaces are spread over several lenticules provide a resulting sequence of images that the interlaces present in angular space that is not in serial order. In order to get the angular distribution of images in the desired order, the images are generally contained on the interlaces in a specific, non-serial order. As discussed above, in order to get a desirable sequence of images on the interlaces, a brightness plot can be created showing the intensity of each interlace and the angle it is presented to a viewer. For example, a set of five interlaces may be associated with viewing or distribution angles as follows (Interlace Number/Angle in Degrees): (1/20); (2/10); (3/40); (4/60); and (5/30). A useful sequence for or sorting of the image slices provided with these five interlaces may be (Interlace Number/Image Number): (1/2); (2/1); (3/4); (4/5); and (5/3), rather than simply a like image number being provided at an interlace location.

In actual practice when a large number of interlaces are printed over a number of lenticules, it is difficult to sort the image order without the aid of a computer program. A computer program calculates the angles and intensities of the interlaces and uses this information in the sorting process. It does this by considering many factors such as splitting of interlaces across lenticule boundaries, ignoring parts of interlaces that might be beyond the useful angular range, and ignoring intensities below a certain threshold.

The following general steps may be used in determining an image order to use on particular interlace (such as may be carried out by a computer program). First, ray trace the lenticules either, e.g., by using a finite width interlace or a zero width interlace. Second, calculate the exit angles of the rays from the lenticules to the viewer. Third, calculate the brightness of the projected rays as a function of viewing angle. Fourth, average the brightness angles for each interlace. Fifth, sort the angles for each interlace such as by scanning all the angles of the projected interlaces and within the criteria limits previously selected (e.g., angular range, lowest brightness value limit, and the like).

Then, the lowest angle value and its associated interlace number may be saved by storing them in temporary storage locations of memory. The scan can be repeated to look for the next lowest value and continuing on until all the interlace angles have been examined. The interlace numbers can be sorted by angles starting from the most negative angle to the greatest positive angle. Image numbers are then assigned to each interlace, with the numbers being in order. Thus, interlaces get assigned image numbers that are not necessarily in the order of the interlace numbers; however, when the interlaces are projected out through the lenticules the images are displayed or come out to a viewer in serial order. Note, the order can also be sorted from positive to negative, and the final image could be rotated 180 degrees to give a desired reading view.

A computer program listing is provided at the end of this description that may be run to perform the sorting of the image slices for interlaces 722 to provide an interlaced image 720 with non-integral and non-standard interlacing (e.g., non-sequential) to generate a sequential image or ray output (e.g., a video or animation clip in which sequential frames are visible in a stepwise manner across a viewing angle or angular distribution of a lens set 715). The computer program may be run on nearly any well known computing device with a processor or CPU, memory, and a monitor, and the program may be implemented with a computer system running the program with code devices for making the computer perform the steps shown in the program listing (not shown with a figure as such a block diagram is not believed necessary to understand the invention). The program listing provides the details of the algorithm that is used for sorting the interlaced image 720 to properly configure the interlaces 722 for a particular lens array 710 and its lens sets 715 as described generally above, but it should be noted that only the code or routines associated with one technique for sorting is provided with supporting subroutines that perform other calculations such as brightness calculations being excluded for simplicity and brevity sake as these subroutines are well-known to those skilled in the optical arts. Note, the program listing uses the term "lenticules" in place of "lens" or "lens element" as used in the description of the algorithm provided above but this term is used at least in the listing in its more generic or broad sense as a synonym for lens.

In one embodiment, brightness plots were prepared for a 100-LPI lenticular structure with 20 interlaces provided over 3 lenticule widths. If images are simply provided serially as in conventional devices, the brightness plot indicates the output is not desirable as the interlaces or images associated with the interlaces is not in serial order. If a computer program such as the one attached or provided herein is used to sort the images for placement in the interlaces (such as with an angular range between −20 and 20 degrees and a threshold of 20 percent of maximum brightness), the output or displayed images are arranged sequentially or serially from 1 to 20. For example, the sequence or order may be as follows for this example (Interlace Number/Image Number): (1/19); (2/16); (3/13); (4/10); (5/6); (6/3); (7/8); (8/18); (9/15); (10/12); (11/9); (12/5); (13/2); (14/20); (15/17); (16/14); (17/11); (18/7); (19/4); and (20/1).

In the selection of the number of interlaces (i.e., slices of images) to be used across a number of lenticules, it is typically preferable to consider overlaps of angles to the viewer between the interlaces. For example, if nine image slices were to be used across three lenticules, the angular distribution of images from the interlaces would overlap as each lenticule would have three interlaces or images in the same position as the other two sets of three interlaces would have to their respective lenticules. A different number of interlaces, e.g., eight or some other number non-divisible by 3, across the three lenticules solves this problem. There is also another solution that can be considered. For those interlaces whose images overlap in angle to the viewer, images can be chosen for those interlaces that are the same. That is, identical images which overlap in angle will not interfere with each other and may actually appear desirably brighter to the viewer. Still another solution is to leave interlaces blank (with no printed image) to avoid interference and use only one of the two or more interfering interlace positions under the lenticules (e.g., use spacing of interlaces of 9 in the above example but print images on less than 9 interlaces).

While not shown in detail with a figure similar to that of FIG. 7, lenticular devices may be paired to the interlaced image by adhesive or a bonding layer. For example, the lens set (or lens array of which it is one component) may include a planar side opposite the lens side, and this side abuts an adhesive layer (such as a thermally activated adhesive such as a polyethylene common in thermal laminating processes). The adhesive layer bonds the lenticular material or lens array to the interlaced image which is made up of image slices provided with the unique interlacing pattern of the invention (e.g., an ink layer) and a substrate or backer layer, which may be plastic, paper, or other material upon which the ink of image slices is printed or provided. In manufacture, the adhesive may be provided on either the lens set/lens array or the interlaced image layer. In one example, though, the adhesive is provided on the interlaced image layer (and, in some cases, a protective layer or coating formed of plastic or other transparent to translucent material may be provided over the ink of the interlaces or image slices such as when the adhesive is a thermally activated adhesive). In other embodiments, the interlaced image slices are printed directly onto the surface or side of the lens array, and a plastic or other material backing is applied with an adhesive that is provided with the backing (e.g., the position of the ink of slices and the adhesive is reversed in the assembly), which is common with gift, smart, credit/debit, and other cards and other fabrication of conventional lenticular material products.

The lens arrays and their plurality of repeating lens sets can be formed from plastic, glass, ceramics, or other transparent to translucent materials from or using coatings, films, and/or other substrates. The lens sets can be conventional lenticular material or custom designed for the combination of interlaced images and, as discussed, each lens set may have an overall viewing angle (e.g., 15 to 75 degrees or more typically 20 to 55 degrees) and the interlaced image is configured with a particular the number of interlaced images under the lens set (e.g., the number and configuration of the lens set is known such that the number of the interlaces can be used to determine a particular interlacing pattern or order to achieve a desired result). The lenticular material or lens arrays of the invention may be fabricated using conventional and well-known methods for producing lenticular sheets, with the particular technique chosen not being limiting of the invention, and the arrays or sheets may be formed into or using a variety of materials. The materials used for forming the lens arrays may be glass, nearly any type of clear (i.e., transparent to translucent) plastic including but not limited to PET, propylene, OPP, PVC, APET, acrylic, or any clear plastic, and/or a ceramic.

In many embodiments, the preferred base material is a plastic, and the plastic may be extruded, calendared, cast, or molded with the tools formed as described above to provide a mirror image of the lens sets arranged in a lens array (e.g., a plurality of side-by-side, linear lenses selected in number to provide a desired frequency such as 10 to 70 LPI or more or another useful frequency to suit a particular interlaced image). One preferred application or fabrication technique involves inline embossing at high speeds using a roll embossing tool. In this embodiment, a film is cast or extruded, and a pattern providing the lens array is placed into the film with a heat or chilled roller. A good film for this application is usually a stable film such as a PET, cast propylene film, or the like. These films can be embossed in thin films of less than one mil to 3 mils or more. A preferred thickness for lens arrays is in the two to thirty mil range. In this application, the film thickness with its lens microstructures can be pre-engineered to focus directly on the back of the film. The film itself can be printed in a web or roll form at very high rates of speed (e.g., over 2,000 feet per minute) in wide web applications. To form image display devices (such as labels, decals, cards, or the like), the film or sheet with lens arrays is mirror or reverse printed with the corresponding interlaced images. At this point, individual devices or products may be cut from the combined rolls or sheets. The film also may be embossed in a thickness that is less than the desired thickness for focus and printing so that an adhesive can be added to the film (i.e., between the lens array and the image slices) so that in combination the adhesive and the film provide the thickness required to focus to the interlaced images properly. The index of refraction of both the film and the adhesive in combination is taken into account in the overall formula or algorithm discussed above for generating lens sets or lens microstructures. In some cases, a film may also be co-extruded with a coating such as a UV, solvent, or water-based coating that may be embossed or extruded on the film with the micro structures built into the coating. With a pre-made film, one can also print in a sheet or web form. The film can be applied over the printed (interlaced) image after the fact. This can be done using equipment such as thermal film applicators like D and K, Bellhoffer and the like in which the film is heated and the adhesive is a hot melt chemistry made with EVA/polyethylene and is activated and applied in register to the printed and interlaced images. This can be done inline in a web process or in a sheet environment.

Another method of manufacturing image display assemblies with lens arrays of the invention is to print the interlaced images on paper or plastic and then either inline or offline, printing or applying a coating, which may be an e-beam, UV, or water-based coating. The coating is applied in a pre-determined thickness, and the lens sets may be embossed into the coating to form the structures and a lens array over the interlaced images at high speed. Again, this may be done inline or offline in a sheet fed press such as a Heidelberg or Komori press or a web press such as a Goss, Heidelberg, or other type of flexo or web offset press. Further, while most embodiments using an embossing tool would use a roll or cylinder for the embossing tool, in any of the above embodiments, it is also possible to use a platen press or flat plate to emboss films or coatings.

With these various methods of manufacturing lens arrays and products including the arrays generally understood, it may be useful to further explain some of the preferred methods of manufacturing lens arrays according to the invention beginning with film embossing. Film embossing is a preferred method of manufacture that is anticipated to be easily adapted for producing lens array or material with the lens sets of the present invention. In this embodiment of manufacture, there are several methods of performing the embossing. Embossing can occur at the time a film is cast, calendared, or extruded. Normally, the embossing is done in line with a chilled embossing roller while the film is still hot. The pressure is applied between a bottom and top roller. For example, the bottom roller may be a polished roller and the top roller an engraved roller, e.g., made out of a nickel-coated copper that is accurately machined in an air bearing lathe. The hot film, which may be propylene, PET, cast PVC, calendar PVC, cast propylene, PETG, or any combination of film or co-extrusion. While the preferred substrate or film may be polyester or PET, and of the substrates can be used. PET films tend to be more stable and maintain the desired structure through the printing and embossing process better than many of the other films. It is also important to note that the refractive index of the material chosen preferably is matched to the desired structure to make microstructures that provide accurate focusing on interlaced images slices. Depending upon width, temperatures, pressures, and other factors, the film may be embossed at up to 10,000 feet per minute. One reason for using a chill roller in the film embossing process is that the molecules in the film form and freeze into place forming the microstructures more accurately when a hot film is embossed with a chill roller regardless of the process.

In some embodiments, cold film is used. Cold film can be heated and embossed with a hot roller forming the microstructures. This is normally done at slightly below the melting temperature or at the melting temperature of the film. The speed at which this embossing can be done is based upon the heat and pressure of the equipment available. For example but not as a limitation, if a substrate melts at about 300° F., embossing is preferably done at about that temperature and, in some cases, at about 6,000 feet per hour. In other embodiments, cold embossing is used to form lens arrays of the present invention. Cold embossing can be done using extreme pressures between nip rollers while narrow web widths are easier and require less tonnage. It is possible, however, in some embodiments to emboss in wide web at up to and over 60-inch web widths. Such cold embossing of the lens arrays into plastic or other material substrates can be done at fairly high rates of speed such as up to about 10,000 feet per hour or more. This is done much the way holographic embossing patterns are embossed in film. The structures tend to be accurate, but the life of the tool is sometimes not very long due to the higher pressures utilized.

Film embossing to form lens arrays of the invention may also include platen embossing. Flat dies are engraved in copper, magnesium, nickel, and other metals. These dies are placed in equipment such as Bobst die cutters and Heidelberg's, Kluges, and other equipment manufacturers' die cutters, punches, presses, or the like used in platen embossing. The film may be fed through in rolls or in sheets and embossed with heat and pressure or just pressure to form the lens sets on a side of the film or substrate. The lenticules or lenses can be embossed onto any of the films using pressure and/or heat and appropriate dwell time to form the microstructures. A significant tonnage or high pressure, such as that needed to emboss holograms, is generally used to emboss the film in the case of platen embossing. In this embodiment, one can have "spot" lens sets that can be registered to the printing in a way such that the lens does not always appear over the printing.

Another preferred method of forming lens arrays according to the present invention is by using an ultraviolet (UV) or e-beam coating to form the structures in a web over a film or substrate (i.e., the lens array would include both the substrate and the web/coating in its array thickness). In a first embodiment of such coating processes, a base film is used that may be any of the films mentioned above. The film may be coated with a UV coating at about 1 to 5 mils, and the coating can be cured through an engraved roller which may be glass or clear plastic. The roller is clear such that the UV or E-beam is directed to pass through the roller while it is in contact with the substrate and squeezing the coating into place on the base film, whereby the microstructures are formed exactly or within very tight tolerances while they are cured to form a lens array as shown in the included figures.

There are other preferred or alternative methods of using e-beam curing or UV curing to make lens arrays with lenses rather than using a clear cylinder to shine UV light through while in contact with the embossing cylinder. For example, one coating method uses a modified laminator to emboss the pattern onto one surface of a film or substrate. This can be done or accomplished with very little pressure using an engraved cylinder and an application roller that applies UV or e-beam coating to the film (which is likely to be propylene, PET, or the like). The coating on the film or substrate is then cured through the film while the film is in contact with the embossed roller. In this method, the speed can be in excess of 10,000 feet per hour and can be done without excessive wear on the embossing cylinder. A downside or possible issue with this method is the cost, which tends to be higher because of the UV liquid used to cast the impression. However, because most of the lens sets are less than a few microns deep, a thin coating is sufficient for producing the lens microstructures (e.g., a coating of less than about 1 mil and more typically less than about 0.3 mils such as about 0.25 mils may be used successfully to create a plurality of lens sets or microstructures with a coating).

In an alternative coating process, a base film is coated with any of the clear coatings mentioned above (keeping in mind that any coating and its refractive index is combined with the thickness and appropriate film refractive index for the appropriate and pre-engineered thickness of the lens array). After the coating is applied to the substrate, it is cured and then embossed. In some cases, the coating is only partially cured and then embossed while it is in a semi-liquid state. In some other cases, the coating on the substrate or base film is embossed in a total liquid state or more liquid state and then cured after the embossing such as down the web a few feet up to several hundred feet. In the former case where the liquid is partially cured, the coating may have a final curing later down the production line either immediately or down the web several feet, and in some cases, the coating may be pre-engineered to post cure in a solid state several hours or even days later to an acceptable hardness.

As shown, the lenticular devices or display assemblies of the present invention generally include a lens array combined with an interlaced image. The lens array and the interlaced image may be combined into an assembly or product in numerous ways to practice the invention. For example, printing of the interlaced image can occur first in gravure, flexography, offset (lithography), screen-printing, or digitally prior to the application of the micro lens structures (e.g., before a lens array and interlaced image are combined), using the interlacing or non-standard image slice patterns of the present invention. This printing could appear in roll, sheet fed, or other method in any of the printing methods. After the interlaced graphic is printed, the lens array or film having numerous lens sets on one side is applied to the interlaced image (or a substrate upon which the image is printed) by film lamination of a pre-embossed lenticular material. This application of film to the pre-printed roll or sheet fed structure can be done inline on a web press (gravure, flexo, web offset, or any other press feeding roll stock) either inline with the printing or offline in a post lamination process.

In some embodiments, the film is applied with a water based adhesive, hot melt, or thermal adhesive such as is extruded in EVA or other methods directly onto the film with a hot melt polymer such as polyethylene, common to the thermal lamination area. Any adhesive used preferably is as clear as possible, and its refractive index is taken into account in the total calculation of each of the polymers and the thicknesses and combined appropriately to equal the correct combined refractive index necessary to focus the lens sets on the pre-interlaced images (e.g., interlaced according to the sorting algorithms described herein). The alignment is performed so that the interlaced printed image and the lens sets coincide properly. This process can be done inline with the printing in a web or roll format or offline later after the roll is printed. Again, the adhesive is preferably clear and the thickness of the adhesive and its refractive index is known so that the total of the polymers (or substrate layers of a finished product) has a desired refractive index to focus to the interlaced images underneath the combined layers or substrates (e.g., underneath the lens sets in the lens array, an adhesive layer, any primer layers, and any other material thicknesses between the lens' surfaces and the interlaced image slices).

The combination of the lens array with the interlaced image may also be done in sheet form, such as with the printed sheet or cardboard in an interlaced form and then post laminated with a pre-embossed (and many times pre-adhesive) coated substrate or film roll containing the lens sets for displaying the interlaced images. Again, the alignment in the proper direction is important. The display assembly fabrication can be done with a Bellhofer, D and K Laminator, GBC laminator or other types of laminators that apply film through hot melt (EVA type, extruded, and activated between 180° F. and 350° F.) or solvent-based pressure sensitive, urethane, or water based adhesive. Again, line up or Y-axis registering is important to achieve desired results. Normally, in a sheet fed environment for packaging, the sheets of paper or plastic would be printed with an interlaced image. Then, the roll of pre-embossed film (or roll of lens array material) would be attached through whatever adhesive process is being used such as heat, pressure, or a combination of both.

Much as described above, UV, E-beam, water-based embossed, and other post-print coatings may be applied directly to the printed substrates. For example, these coatings that provide the lens array may be applied via application roller in the appropriate and pre-engineered thickness for the correct combination of refractive indexes to form the lens sets on top of or adjacent to the printed interlaced image on the substrate (e.g., plastic, paper, or other material substrates or layers). The coatings may be embossed over the interlaced printing by way of an engraved cylinder, flat die, or other method using pressure or heat and pressure thereby forming the coating into a lens array of many lens sets. The coating may also be partially cured before embossing, uncured in liquid state, or partially cured and post-cured later by means of E-beam, UV, or any other method including solvent or water evacuation. This embossing may be in the form of a roll or sheet and will be accurately post embossed.

In some embodiments, it is desirable to use printing offset, digital printing, screen printing, or other printing of the interlaced image onto a sheet fed film or web and then to apply a lens array. For example, a film may be embossed to contain the lens array (e.g., a plurality of lens sets) and then be laminated to the pre-printed substrate inline or in an offline process. The interlaced image is printed so that the files match the lens array configuration and its lens sets exactly or within tight tolerance, with such alignment generally being required to be excellent as with any lens system to achieve desirable results. The film upon which the lens array is embossed can have an EVA adhesive upon the non-lens or planar side and be applied with a Bellhofer, D and K or other thermal laminator at about 150 feet per minute over the substrate. This is particularly advantageous for printing cartons and thicker boxes. The substrate, e.g., cardboard or board of some type such as SBS and boards of 10 mils to over 40 mils, can be printed with the interlaced image on a traditional sheet fed system such as a Heidelberg, Komori, Roland, KBA, and the like. The interlaced image can be relatively coarse (such as 20 to 60 LPI), and the lenticules or lenses applied can be embossed on the film, which will total up to about 2 to about 10 mils or more in thickness.

Any and all of the methods described herein can be reproduced using a combination substrate with the same results and methods of manufacture. In these embodiments, the substrate or film itself can be made in several different ways. The base films may be a combination of APET, PETG, and/or combinations of film such as PET and other softer films. In many cases, the top line or layer of film is a softer film like polyethylene combined with a tougher substrate such as a polypropylene. In these combination substrates used for forming lens arrays, the base film can provide stability while the top film can be softer and easier to emboss with the lens sets or lens microstructures of the present invention to form a lens array including the top film and tougher substrate. An ideal combination may be a PET base film with a softer propylene film laminated with a solvent based adhesive or solvent less adhesive such as a urethane adhesive like "More Free 403" by Rohm and Haas. The top film can be laminated with a thermal film EVA adhesive as well.

As described with reference to FIG. 2A and elsewhere, a lenticular device or display assembly can readily be formed simply by printing directly on the reverse side of a pre-embossed film or substrate (i.e., onto the back or planar surface of a lens array). One efficient method of production of display assemblies involves printing onto a pre-embossed film a pre-engineered number of interlaced image slices or sets of slices, e.g., sets of slices equal in number to the number of lens sets in the lens array opposite the interlaced image. The printing can occur in sheet or roll form at a very high rate of speed (e.g., over 2,000 feet per minute). The film may be printed in a course and easy to print interlaced image configured for a conventional lenticular material of 20 LPI or less.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, specific values have been presented for the number of lenses in a lens set and for numbers of interlaces provided in image sets, but these numbers can each vary significantly to practice the invention and the combinations that can be made of these two parameters also can vary widely. In some cases, the lens sets may have as little as 2 lenses or lenticules but more typically the lenses in each lens set will be 3 to 15 or more. Similarly, the number of interlaces typically will be several interlaces to many interlaces such as up to 70 to 100 interlaces or more (with larger numbers, in some cases, being more acceptable when greater numbers of lens are provided in a lens set to create a wider printing area under the lens sets and/or when the frequency or LPI is more coarse as this also increases the size of the printing area under the lenses).

Program Listing for Lens Microstructure Generation/Configuration

```
Sub Calculate_Image_Sequence(n) 'Name
'n=1 sequence 1,2,3 ..., n=2 arrange in best angular serial
   order (choice of conventional or sorted order desired)
'Declaration of variables
Dim mintemp As Long
Dim i, j, itemp As Integer
Dim typecalculation As Integer
Dim s1 Ad Double
Dim s2 As Double
Dim templow As Double
Dim isave(60) As Integer
Dim angleaveragetemp(60) As Double
On Error GoTo CIS99
If n=1 Then 'Here the subroutine puts the image numbers in
   serial order if unsorted ray tracing is desired.
   For i=1 To 60 'This version of the program allows up to 60
interlaces and images to be considered.
      ImageNumber(i)=i
   Next i
   Exit Sub
End If
If n=2 then 'This is the sorting part of the subroutine.
   If BrightnessCalculated=False Then 'The brightness cal-
culations are made before doing the sorting.
      MsgBox ("Brightness has not been calculated")
      Exit Sub
   End If
'search the brightness array to get interlace order by angle.
   For i=1 To 60
      AngleAverage(i)=0 'Initialize the array.
   Next i
Form1.Cls
   For j=1 To NumberInterlaces 'The number of images has
been previously selected by the user.
      s1=0
      s2=0
      For i=AngleSequenceLimitLeft to angleSequenceLimi-
         tRight 'angle limits
         If BrightInterlace(i, j)>MinimumSequenceThreshold
            Then 'threshold of search
            s1=s1+BrightInterlace(i, j) 'sum the brightness of inter-
               lace j over all angles i.
            s2=s2+CDbl(i)*BrightInterlace(i, j) 'this is a weighting
               of angle and brightness to get the average angle
         End If
      Next i
      If s1<>0 Then
         AngleAverage(j)=s2/s1 'here is the average angle for inter-
            lace number j
      End If
   Next j
'Sort the angle average from lowest to highest.
'Find the lowest value.
   For j=1 To NumberImages 'initialize arrays for saving
angle and interlace order
      isaved(j)=0
      AngleOrder(j)=0
   Next j
   Templow=10000
   j=0
   While j<NumberImages 'searching all images
      For i=1 to NumberImages
         If isaved(i)=0 and AngleAverage(i)<templow then 'find
            the most negative average angle of interlace number j
            templow=AngleAverage(i) 'save the most negative
               angle
            itemp=i 'save the index of the most negative average
               angle
         End If
      Next i
      isaved(itemp)=1 'flag to skip lowest values found for the
next run through the loop so that the next lowest value will be
found and saved
      j=j+1
      AngleOrder(j)=itemp 'saves the order of the angles
      templow=10000 'reset the comparison value for saving
   Wend
   For i=1 To NumberImages
      ImageNumber(AngleOrder(i))=1 'number the image num-
bers according to the angle order
      angleaveragetemp(i)=AngleAverage(AngleOrder(i))
   Next i
   For i=1 To NumberImages 'renumber the angle averages
      according to the image order
      AngleAverage(i)=angleaveragetemp(i)
   Next i
Form1.Cls
   Print "Interlace# Image Number AngleAverage Diff in angle"
      'display the ordering to the user
   For j=1 To NumberInterlaces
      Print j, ImageNumber(j), FormatNumber(AngleAverage
(j),2),
      FormatNumber((AngleAverage(j+1)−AngleAverage(j)),2)
   Next j
   ImageOrder=True
End If
Exit Sub
CIS99:
If CancelError=True Then
   MsgBox ("Calculation of Image Sequence was canceled")
   Exit Sub
End If
```

We claim:

1. A lenticular device for displaying an interlaced image, comprising:
    an interlaced image comprising sets of elongate image elements; and
    a lens array comprising a first side proximate the interlaced image and a second side comprising a plurality of lenticules, wherein lens sets comprising at least two adjacent ones of the lenticules are each paired with one of the sets of the image elements.

2. The lenticular device of claim 1, wherein the number of the lenticules in each of the lens sets is equal, and the number of the image elements in one of the sets of image elements divided by the number of the lenticules is a non-integer.

3. The lenticular device of claim 2, wherein the number of the lenticules is greater than about 3 and the number of the image elements is greater than about 10.

4. The lenticular device of claim 2, wherein rays exiting from each of the lens sets from the image elements are dispersed at substantially unique viewing angles.

5. The lenticular device of claim 1, wherein each of the sets of the image elements comprises interlaces taken from images having a sequential ordering and wherein the interlaces are provided in the interlaced image in an order differing from the sequential ordering of the images.

6. The lenticular device of claim 5, wherein the order of the interlaces is chosen such that rays exiting the lens sets correspond to the images in the sequential ordering.

7. The lenticular device of claim 1, wherein the lens array has a thickness of less than about 120 mils and the lenticules are provided in the lens array at a frequency of at least about 15 lenticules per inch.

8. The lenticular device of claim 1, wherein the lens set has a width equal to the combined widths of the at least two adjacent ones of the lenticules and wherein each of the image elements have a width in the interlaced image equal to about the lens set width divided by the number of the image elements provided in each of the sets of image elements.

9. A lenticular product, comprising:
   a layer of lenticular material comprising a first side and a second, opposite side comprising a plurality of elongate lenses; and
   an interlaced image positioned proximate the first side comprising a plurality of interlaces each comprising a slice of an image, wherein the interlaces are arranged into image sets each having an equal number of the interlaces, wherein the image sets are mapped to sets of at least two of the lenses, and wherein the number of the lenses in each of the sets of the lenses is a non-integral multiple of the number of the interlaces in the image sets.

10. The product of claim 9, wherein the images corresponding to the slices are related and have a sequential order and wherein the interlaces in each of the image sets are arranged in an order differing from the sequential order.

11. The product of claim 10, wherein the order of the interlaces in the image sets is selected such that rays exiting the sets of the lenses are in the sequential order.

12. The product of claim 11, the viewing angle of each of the sets of the lenses is less than about 60 degrees and the rays exit the sets of the lenses at substantially unique angular portions of the viewing angle.

13. The product of claim 9, further comprising a substrate upon which the interlaced image is printed and wherein the substrate is bonded to the lenticular material with an adhesive disposed between the interlaced image and the first side of the lenticular material.

14. The product of claim 13, further comprising a package and wherein the substrate is attached to the package or provided as an integral portion of the package.

15. An image display assembly, comprising:
   a lens array comprising lenticules on a first surface, the lens array comprising a thickness of material that is at least translucent and the lenticules provided at a frequency that defines a width of each of the lenticules; and
   a layer of ink bonded to the lens array on a second surface of the lens array, the layer of ink comprising a plurality of image sets each including a plurality of interlaces of a number of images that have a sequential order associated with a visual effect, wherein each of the image sets is provided under a set of the lenticules.

16. The image display assembly of claim 15, wherein the interlaces of each of the image sets is arranged in an order differing from the sequential order.

17. The image display assembly of claim 15, wherein each of the interlaces has a width equal to about a combined width of the lenticules in the set of the lenticules provided over the interlaces divided by the number of images.

18. The image display assembly of claim 15, wherein each of the sets of the lenticules has a number of the lenticules that is a non-integral multiple of the number of images, whereby each of the lenticules is positioned over at least one fractional portion of one of the interlaces.

19. The image display assembly of claim 15, wherein the number of lenticules in each set of the lenticules is at least about 3 and the number of interlaces in each of the image sets is at least about 7.

20. The image display assembly of claim 15, wherein the lens array has a thickness of less than about 30 mils, the frequency is greater than about 30 lenticules per inch, and each of the interlaces is at least about 0.8 mils wide.

* * * * *

UNITED STATES PATENT AND TRADEMARK OFFICE
CERTIFICATE OF CORRECTION

PATENT NO. : 7,480,100 B1  Page 1 of 1
APPLICATION NO. : 11/872338
DATED : January 20, 2009
INVENTOR(S) : Raymond et al.

It is certified that error appears in the above-identified patent and that said Letters Patent is hereby corrected as shown below:

Title Page, Item (56) References Cited, insert the following:

--Other Publications
VETRO, ANTHY, et al., "Coding Approaches for End-To-End 3D TV Systems" Mitsubishi Electric Research Laboratories, December 2004, TR2004-137.--

Signed and Sealed this

Tenth Day of March, 2009

JOHN DOLL
*Acting Director of the United States Patent and Trademark Office*